United States Patent
Mickael

(10) Patent No.: US 6,590,202 B2
(45) Date of Patent: Jul. 8, 2003

(54) STANDOFF COMPENSATION FOR NUCLEAR MEASUREMENTS

(75) Inventor: Medhat W. Mickael, Sugar Land, TX (US)

(73) Assignee: Precision Drilling Technology Services Group Inc., Calgary (CA)

( * ) Notice: Subject to any disclaimer, the term of this patent is extended or adjusted under 35 U.S.C. 154(b) by 100 days.

(21) Appl. No.: 09/851,635

(22) Filed: May 8, 2001

(65) Prior Publication Data

US 2002/0008197 A1 Jan. 24, 2002

Related U.S. Application Data

(63) Continuation-in-part of application No. 09/579,971, filed on May 26, 2000.

(51) Int. Cl.[7] .................................................. G01V 5/14
(52) U.S. Cl. ........................... 250/269.2; 250/269.1; 250/269.3; 250/269.7
(58) Field of Search ........................ 250/269.2, 269.1, 250/269.3, 269.7, 265

(56) References Cited

U.S. PATENT DOCUMENTS

| | | | |
|---|---|---|---|
| 5,091,644 A | | 2/1992 | Minette |
| 5,175,429 A | | 12/1992 | Hall, Jr. et al. |
| 5,235,185 A | * | 8/1993 | Albats et al. ............ 250/269.5 |
| 5,250,806 A | | 10/1993 | Rhein-Knudsen et al. |
| 5,397,893 A | | 3/1995 | Minette |
| 5,420,422 A | * | 5/1995 | Loomis .................... 250/269.4 |
| 5,451,779 A | | 9/1995 | Spross et al. |
| 5,473,158 A | | 12/1995 | Holenka et al. |
| 5,486,695 A | | 1/1996 | Schultz et al. |
| 5,513,528 A | | 5/1996 | Holenka et al. |
| 6,307,199 B1 | * | 10/2001 | Edwards et al. .......... 250/269.3 |
| 2002/0165670 A1 | * | 11/2002 | Ellis et al. ...................... 702/8 |

FOREIGN PATENT DOCUMENTS

| | | | | |
|---|---|---|---|---|
| EP | 0519675 A1 | * | 12/1992 | ........... E21B/47/00 |
| EP | 0389345 B1 | | 6/1995 | |
| GB | 2261068 A | | 5/1993 | |
| GB | 2320567 A | | 6/1998 | |
| GB | 2362949 A | | 5/2001 | |

\* cited by examiner

*Primary Examiner*—Constantine Hannaher
(74) *Attorney, Agent, or Firm*—Patrick H. McCollum

(57) ABSTRACT

A nuclear logging-while-drilling measuring systems, and the correction of the formation property measurements for adverse effects of instrument standoff from the borehole wall, is disclosed. Detector responses for one or more downhole detectors are sampled and recorded over a time segment. The response samples are then sorted by magnitude, and a running integral of the sorted samples as a function of time is performed over the time segment. Linear segments are then fitted to the running integral, wherein each straight line segment is a function of one or more formation properties, and also a function of the standoff distance of the detector from the borehole wall. Segments are then combined to obtain a measure of one or more formation properties of interest such as formation density, where the adverse effects of borehole standoff are minimized. Standoff magnitude is also obtained and can be used to correct other logs, such as a neutron porosity log, for adverse effects of tool standoff and borehole size. No independent caliper of the borehole is required to perform the standoff correction.

37 Claims, 12 Drawing Sheets

STANDOFF COMPENSATION FOR NUCLEAR MEASUREMENTS

CROSS REFERENCES TO RELATED APPLICATIONS

This application is a continuation-in-part of application Ser. No. 09/579,971 filed on May 26, 2000.

BACKGROUND OF THE INVENTION

1. Field of the Invention

This invention is directed toward the measure of properties of earth formation, and more particularly directed toward nuclear measuring systems and the correction of the formation property measurements for adverse effects of instrument standoff from the borehole wall. The invention can be used to make formation property measurements while drilling the borehole, or subsequent to drilling using wireline techniques.

2. Background of the Art

Essentially all nuclear instrument systems used to measure earth formation parameters from within a well borehole are adversely affected by borehole conditions. Borehole conditions include borehole fluid type, borehole irregularity, and the size of the spacing or "standoff" between the downhole measuring instrument and the wall of the borehole. To increase the accuracy, it is necessary to correct measured parameters for borehole conditions including standoff. This correction process is commonly known as "standoff correction".

Nuclear measurement systems have been used for decades to measure various properties of earth formation penetrated by a well borehole. The first systems used downhole instruments or "tools" which were conveyed along the borehole by means of a "wireline" cable. In addition, the wireline served as a means of communication between the downhole tool and equipment at the surface, which typically processed measured data to obtain formation parameters of interest as a function of depth within the borehole. These measurements, commonly referred to as "well logs" or simply "logs", include measures of formation natural gamma radiation, thermal neutron flux, epithermal neutron flux elastic and inelastically scattered neutron, capture gamma radiation, scattered gamma radiation, and the like. A variety of formation parameters are obtained from these measurements, or combinations of these measurements, such as shale content, porosity, density, lithology and hydrocarbon saturation. Most of these nuclear wireline measurements are adversely affected by the borehole. Standoff of the instrument from the borehole wall is an almost universal problem considering the inherently shallow radial depth of investigation of nuclear logging systems.

Wireline systems use a variety of mechanical means to minimize standoff by forcing the tool against the borehole wall. As examples, a prior art neutron porosity tool typically use a bow spring to forced the tool against the borehole wall thereby minimizing standoff effects. A typical scattered gamma ray density tool is constructed with a gamma ray source and one or more gamma ray detectors in a "pad" which is mechanically forced against the borehole wall to again minimize standoff effects. Even though controlling the physical position of a wireline nuclear tool within the borehole aids in minimizing borehole effects including standoff, other tool design and data processing techniques are used to further reduce these adverse effects. As examples, neutron porosity and density tools typically use two or even more radiation detectors at different spacings from a neutron or density source, respectively. Detector responses are then combined using a variety of algorithms to further minimize borehole effects in the final computed parameter of interest. As an example, a dual detector processing method known as the "spine and rib" technique was introduced in the 1960's as a means for compensating dual detector density wireline logs for the effects of standoff. This technique relies solely on the response of the two downhole detectors and a tool calibration to compensate for small tool standoffs which are not overcome by mechanical means. The method is effective for standoff magnitudes of generally less than one inch. For larger standoffs, the spine and rib system, used alone, is not an effective compensation means.

Wireline logging is applicable only after the borehole has been drilled. It was recognized in the 1960s that certain operational and economic advantages could be realized if drilling, borehole directional, and formation properties measurements could be made while the borehole is being drilled. This process is generally referred to as measurement-while-drilling (MWD) for real time drilling parameters such as weight on the drill bit, borehole direction, and the like. Formation property measurements made while drilling, such as formation density, are usually referred to as logging-while-drilling (LWD) measurements. The LWD measurements should conceptually be more accurate than their wireline counterparts. This is because the formation is less perturbed in the immediate vicinity of the borehole by the invasion of drilling fluids into the formation. This invasion alters the virgin state of the formation. This effect is particular detrimental to the more shallow depth of investigation nuclear logging measurements.

For brevity, only LWD systems will be discussed. The tools are typically mounted within a drill collar near a drill bit which terminates the lower end of a drill string. The diameter of the drill collar in typically smaller than the diameter of the drill bit. This factor, along with the fact that there is usually a certain amount of drill string "wobble" and "bounce" during drilling, results in a borehole with diameter greater than the bit gauge, which in turn results in varying standoff between the LWD instrument and the borehole wall. Furthermore, circulation of drilling fluid in the borehole tends to wash out or enlarge the borehole causing still greater and more unpredictable standoff. Even though the major elements of most LWD tools are mounted near the periphery of the drill collar and typically within one or more collar stabilizer fins, standoffs can be quite large and can change dramatically with each rotation of the drill string. Mechanical means such as bow springs and powered pad mandrels used in wireline counterparts are obviously not applicable as a means for minimizing standoff in a rotating drill string. Again for brevity, a prior art "gamma—gamma" density LWD system using preferably two gamma ray detectors will be discussed. Operational concepts of this type of density tool are known in the art. It should be understood, however, that many of the previously discussed difficulties and limitations are applicable to other prior art nuclear logging systems such as neutron porosity. LWD formation density systems differ from their counterparts in wireline by the fact that the measurement is made while the tool is rotating with the drill string, thereby causing varying standoff between the tool body and the formation. Typically, an LWD density tool may encounter standoffs anywhere from zero to one inch or greater, depending on the borehole shape and tool configuration. Count data from the preferably two axially spaced detectors are usually sampled at a much faster rate than rotational time, which results in fairly constant standoff per sample. Short sample time periods are used to increase the accuracy of the measurement. However, due to the short sampling time and the statistical nature of the measurement, the detector counts in each sample do not have sufficient statistical precision to apply a statistically meaningful standoff correction such as a spine and rib correction. To improve statistical precision of the measurement and subsequent corrections, count data are summed over a radial segment of the borehole before a standoff correction is applied. Although this improves statistical precision, accuracy is sacrificed.

In attempt to retain both statistical precision and accuracy, prior art LWD density, neutron porosity, and other types of nuclear tools often use independent systems to measure the radial shape of the borehole. This is often referred to as a "caliper" of the borehole. Caliper measurements are then combined with detector count data and a spine and rib or other type of correction algorithm to obtain borehole compensated density or other parameter of interest. The caliper is, in itself, a complete and self contained LWD tool with all of the associated complexity, initial cost, operational cost, and reliability problems. The caliper system, unlike wireline counterparts, can not make physical contact with the borehole wall since the drill string is typically rotating. Ultrasonic transducers are commonly used in LWD caliper systems. They define the shape of the borehole by measuring travel time of acoustic waves emitted from the transducer, reflected by the borehole wall, and subsequently detected by the transducer.

U.S. Pat. Nos. 5,397,893 and 5,091,644 to Daniel C. Minnette are related and disclose an LWD tool which measures formation density. An error minimization method is used to sort or "bin" count data from two detectors before applying a standoff correction. In a first embodiment, the borehole cross section is radially segmented and preferably divided into four quadrants. Counts recorded in each quadrant are sorted over multiple rotations of the tool by quadrant in which they are measured. The sums of sorted counts are subsequently combined to obtain a density measurement for a particular borehole segment, which is compensated to some degree, for standoff within that segment. Segmenting of the borehole is predetermined in that the system is initially set up to record counts preferably within 90 degree segments as the tool rotates within the borehole. Alternately, the borehole can be partitioned in a different manner if borehole conditions are thought to warrant such partitioning. As an example, boreholes known to be very radially irregular might warrant smaller segments, such as 45 degrees. The decision must be made before the LWD operation is initiated. A second embodiment of the Minnette system teaches a measurement from an independent borehole caliper, such as an acoustic caliper, to define the count sorting scheme prior to correcting density measurements for standoff. This overcomes the problem of changing borehole conditions, but adds complexity and cost to the system in the form of a stand-alone LWD borehole calipering system.

U.S. Pat. No. 5,486,695 to Ward E. Schultz discloses an LWD nuclear logging system which used an independent sensor, such as an acoustic transducer, to measure tool standoff. The system uses a method similar to Minnette's to correct for standoff by sorting or "binning" detector count data as a continuous rather than a discrete function of standoff. The independent tool standoff measurement is then combined with detector count data using various weighting schemes to obtain formation parameters of interest which have been compensated for standoff. The system requires an independent tool standoff measuring system which, again, adds cost and complexity to the LWD.

U.S. Pat. No. 5,473,158 to Jaques M. Holeuka et al discloses methods and apparatus for measuring density, neutron porosity, and other formation parameters using a LWD system. One embodiment of the system uses ultrasonic transducers to determine standoff, and the standoff measurement is used to correct porosity, density and other parametric measurements for adverse effects of tool standoff. Once again, an independent borehole caliper instrument is required for the standoff measurement. A quadrature method of azimuthally partitioning the borehole is used in an alternate embodiment to detector responses from predetermined angular segments of the borehole. As an example, the borehole is divided into 90 degree segments, and means such as directional equipment (accelerometers, magnetometers and the like) or even count rate processing are used to define detector signals from the "bottom", the "top", and the "sides" of the borehole. The measurement from the segment with the least standoff is then chosen to be the best measurement. This introduces additional statistical uncertainty into the measurement in that significant amounts of measured data are not used to compute the parameters of interest.

U.S. Pat. No. 5,451,779 to Ronald L. Spross et al discloses a LWD density system which uses a "statistical flag" to determine when density measurements should be corrected for standoff. The flag compares actual statistical variations of measured count rates with theoretical statistical variations for the tool operating in a standard or gauge bore hole. The system requires control and monitoring of the rate of rotation of the tool in order to make meaningful comparisons between measured and theoretical statistical variations. If the difference between the two variations exceeds a predetermined value, an irregular section of borehole is "flagged" and appropriate corrections are made to the measured data using the spine and rib technique or other similar data correction schemes. In an alternate embodiment, an acoustic borehole caliper is used to flag irregular borehole conditions or tool standoff thereby requiring dedicated borehole calipering system with accompanying increase in hardware complexity and cost. Once a section of irregular borehole or a standoff condition is flagged, other means such as the spine and rib technique are used to correct the measured count rates, and to thereby obtain a borehole compensated density measurement.

U.S. Pat. No. 5,250,806 to Erik Rhein-Knudsen et al discloses apparatus for measuring the formation parameters density, neutron porosity, and photoelectric absorption (PF) factor. The system is embodied as a LWD tool, and no data processing methods are discussed. The density portion of the tool comprises a gamma ray source mounted eccentrically within a drill collar housing and two longitudinally spaced gamma ray detectors located in blade comprising a first set of stabilizer blades. The neutron porosity portion of the tool comprises a neutron source mounted concentrically within the drill collar housing and preferably two longitudinally spaced secondary radiation detectors (either neutron of gamma ray) located in a blade comprising a second set of stabilizer blades. PF is obtained from an energy spectrum of one or both of the gamma ray detectors in the density section. The preferred embodiment of the invention includes a pair of blade mounted, opposing ultrasonic transducers used to determine standoff which, in turn, is used to correct the neutron porosity and density measurements for adverse effects of tool standoff. There is no specific teaching of standoff correction methods with or without ultrasonic borehole size parametric measurements. The patent is directly only toward apparatus.

U.S. Pat. No. 5,175,429 to Hugh E. Hall, Jr. discloses a secondary LWD measurement system for determining tool displacement from the borehole wall, and the subsequent use of this displacement or standoff measurement to correct nuclear parametric measurements, such as density and neutron porosity, for adverse effects of standoff.

SUMMARY OF THE INVENTION

This invention is directed toward nuclear measurements within a well borehole. The invention is applicable to logging-while-drilling (LWD) and to wireline systems. The disclosure is applicable to both LWD and wireline systems which provides a measure of one or more parameters of interest of an earth formation penetrated by a borehole. The measurements are corrected for adverse effects of the borehole including tool standoff from the borehole wall.

The invention is applicable to a variety of nuclear logging systems. Emphasis will, however, be directed toward the system embodied as a combination LWD density and neutron porosity tools. The neutron porosity tool can be used to determine other parameters, such as formation. For this reason, the neutron porosity tool will be referred to as the "neutron" tool, with the understanding that formation porosity is only one of several parameters of interest that can be measured using the tool. The density tool is preferably in close proximity to the neutron tool. The response of the density tool can be used to correct the response of the neutron porosity tool for adverse borehole effects including borehole size, drilling fluid weight, drilling fluid salinity and tool standoff.

Attention is first directed toward the density measurement. For purposes of discussion, the density tool will be embodied as a dual detector formation density tool comprising a preferably isotopic source of gamma radiation and two longitudinally spaced gamma ray detectors. The source and detectors are preferably mounted within the wall of a drill collar, hereafter referred to as the "tool", which is mounted in a drill string in the vicinity of a drill bit. The tool rotates as the drill string is rotated thereby allowing the drill bit to advance the borehole. Tool rotation is not a necessary requirement to operate the invention. The invention is also operable when a downhole motor is used to rotate the drill bit, and the tool is above this rotating portion of the drill string.

As a brief summary of operating concepts of a dual detector density tool is presented so that the present invention can be more easily understood. Gamma radiation is emitted by the source, passes through any material between the tool and the borehole wall, enters the formation where it interacts with material within the formation, and a portion of the radiation is scattered back into the borehole at a reduced energy. A portion of radiation scattered back into the borehole is recorded by the detectors. Source gamma ray energy is selected so that the primary mode of reaction is Compton scatter, which is related to the electron density of the composite formation material including the formation matrix material and any fluid filling pore space within the matrix. Electron density is, in turn, is related to the "bulk" density of the formation. The count rate measured by the tool detectors can, therefore, be related to the formation property of interest, which is bulk density. This relationship is determined by calibrating the tool under known borehole and formation conditions, and is known in the art. Gamma radiation not only interacts with the formation, but also with any intervening material between the tool and the borehole wall. This intervening material includes borehole fluid and particulate material, known as "mudcake", which builds up on the borehole wall due to invasion into the formation of borehole fluid. Mudcake and any other intervening material adversely affect the bulk density measurement. Two detectors are used to minimize the effects of mudcake and tool standoff. The responses of the two detectors can be combined to minimize the effects of standoff and mudcake using a variety of algorithms including the spine and rib algorithm. The effects of standoff are typically much more severe in nuclear LWD systems than in wireline systems, even though mudcake buildup is minimal and the borehole fluid type is constant or at least slowly varying with the drilling operation. An LWD density tool typically rotates continuously inside the borehole as the measurement is being made. If the tool rotates centralized within a borehole which is necessarily larger than the tool, detector counts rates will be constant as a function of time for a given formation density and borehole diameter. If the standoff is perhaps one inch or less, and the counts collected are statistically significant, the spine and rib method can be used to compensate for standoff, and an accurate measure of formation density can be obtained. Rarely in practice does the tool rotate concentrically within the borehole. Since most boreholes are not exactly vertical, and considering the torque on the drill bit and the flexibility of the drill string, the tool is most likely rotating against one side of the borehole. Recall that the source and detectors are preferably located within the wall of the tool. During a complete rotation of the tool, standoff that the density tool "sees" varies from essentially zero when the tool is oriented so that the source and detectors are facing a tool contact point on the borehole wall, increases to a maximum 180 degrees later when the source and detectors are facing the direction, and then decreases to essentially zero when the tool is again oriented so that the source and detectors are again face the borehole wall. Measured count rate is now a function of formation density, borehole diameter, and a variable standoff caused by the eccentric rotation of the tool within the borehole. A simple spine and rib analysis of the count rate data will yield statistically insignificant measurements or inaccurate measurements, or both, as will be detailed in a following section of this specification.

The present LWD density system collects or "samples" counts in each detector as the tool rotates. The sample time interval is selected to be relatively short when compared with the time required for one complete rotation of the tool. By selecting a short sample time interval, tool standoff varies insignificantly during the sampling. The short sample time interval results, however, in a count sample measure with a large statistical error. This would yield a statistically insignificant bulk density measurement if the spine and rib technique were applied to each set of detector count sample measurements. To overcome the statistics problem, samples are collected and stored for a sample period that typically includes several hundred or more count sample intervals and several rotations of the tool. It is desirable to make the sample period sufficiently long to minimize statistical error in the final density measurement, but also sufficiently short so that the change in true formation density seen by the tool is minimal. Samples from each detector are sorted by magnitude, and a running sum or integral of count rate data is performed over the sample period. If the tool is operating centered within the borehole, a plot of integrated counts as function of time will be a straight line over a selected sample period, with the slope of the line representing detector count rate which, in turn, represents an "apparent" density. Apparent densities are processed preferably using the spine and rib technique to obtain bulk density compensated for standoff. If the tool is operating eccentered within the borehole, integrated counts sorted by magnitude and plotted as a function of time over the sample period will be a non-linear curve. In this case, which as mentioned above, is typical a plurality of contiguous, straight line segments is fitted to the nonlinear curve using predetermined fitting criteria. Detector count sample measurements within each segment are summed, and combined with a time duration of the segment to obtain a segment count rate. Apparent density for the segment is then determined for a standoff over an azimuthal segment of the borehole. The use of count rate and subsequently apparent density from a fitted straight line segment is far more statistically significant than using count rate and associated apparent density from a single detector sample within the segment. Apparent densities obtained from the fitted straight line segments are then processed using the spine and rib or other correction technique to obtain a borehole compensated density for each segment. Weighting is used to emphasize measurements with minimal statistical uncertainty, and compensated densities from all segments are then combined to yield a composite, compensated bulk density which is accurate and statistically significant. Alternate means for determining density and standoff from the density tool response will be discussed in subsequent sections of this disclosure.

Attention is now briefly directed toward the neutron tool. The neutron tool responds mainly to the hydrogen content of the borehole environs. If it is assumed that most hydrogen is contained in pore space of earth formation and not in the rock matrix, then a tool response to hydrogen concentration can be related to formation porosity. Unfortunately, hydrogen is usually also present in fluid within the borehole, therefore the neutron tool response is also affected by borehole size, drilling mud weight, drilling mud salinity, and tool standoff. Porosity measurements must be corrected for these effects in order to obtain accurate parametric measurements. Previously discussed standoff data obtained from the density measurement can be used to correct the neutron tool response for borehole size and standoff effects.

It is known in the art that neutron tools respond to other elements and conditions, such as boron typically found in shales. The basis concept of the neutron prosity measurement is, however, based upon the neutron tool's response to hydrogen.

It is noted that the invention does not require a rotating tool. In cases where a downhole motor such as "mud" motor is used to rotate the bit, or the density measurements are made as the drill string is being withdrawn from the borehole, techniques disclosed in this specification are equally applicable. A rotating drill string and tool are used for purposed of discussion.

The present LWD system requires no independent borehole calipering means. No predetermined azimuthal segmenting of the well borehole is required, but the system can be used to measure azimuthal density values in predetermined segments of the borehole if desired. The system is automatic and operates effectively when the tool is operating centered or eccentered within the borehole. Although the system has been summarized configured as a compensated density tool, the basic concepts are applicable to other nuclear LWD logging systems such as formation photoelectric factor measurements.

DETAILED DESCRIPTION OF THE PREFERRED EMBODIMENTS

As stated previously, the invention is applicable to a variety of nuclear logging systems. The preferred embodiment will, however, be disclosed as a dual detector LWD density tool.

Figure 1:
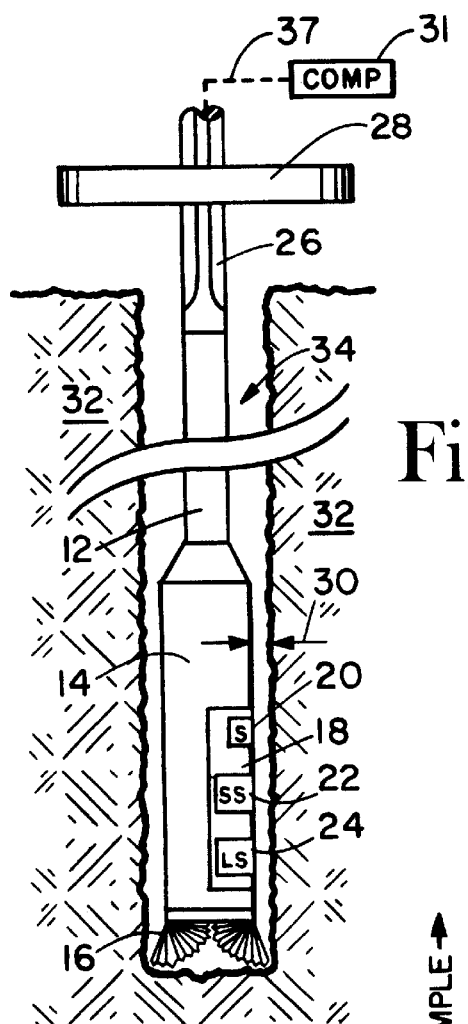
FIG. 1 shows the invention embodied as a dual detector LWD tool conveyed within a well borehole by an operating drill string.

FIG. 1 shows an LWD density instrument 18 mounted within the wall of a drill collar 14 which will be subsequently referred to as the LWD tool. The density instrument 18 comprises a source of gamma radiation 20 which is preferably an isotopic source of $^{137}$Cs or $^{60}$Co. A "short spaced" radiation detector 22 and a "long spaced" radiation detector 24 are spaced from the source 20. Radiation detectors 22 and 24 are preferable scintillation type gamma ray detectors. The tool 14 is conveyed along a borehole 34 penetrating an earth formation 32 by a drill string 12. The drill string 12 is terminated at the lower end by a drill bit 16, and at the upper end by a kelly 26 which engages a rotary table 28. The rotary table is rotated preferably by a standard drilling rig (not shown) known in the art thereby rotating the drill string 12, the attached tool 14, and the drill bit 16 to advance the borehole 34. In the alternate, a downhole motor (not shown) can be used to rotate the bit and to provide drilling directional control. The tool 14 is shown standing off of the wall of the borehole 34 by a distance 30. FIG. 1 also shows a computing means 31 which is in communication with the density instrument as illustrated conceptually with a broken line 37. The computing means 31, which is used to control the density instrument 18 and process measured data, can be located within the tool 14 or at the surface of the earth.

Figures 2A, 2B:
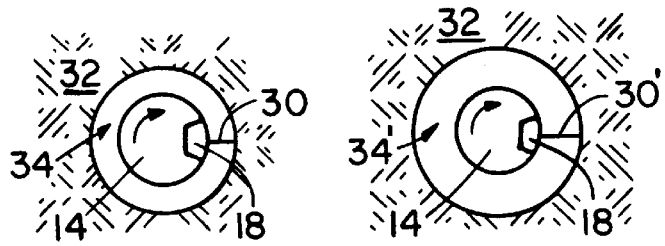
FIG. 2a is a sectional view of the LWD tool operating centralized and with constant standoff in a borehole of a first diameter.
FIG. 2b is a sectional view of the tool operating centralized and with constant standoff in a borehole with a second and larger diameter.

FIG. 2a is a sectional view of the tool 14 rotating centralized, as shown conceptually by the arrow, within the borehole 34. The standoff 30 of the instrument section 18 is constant through the entire rotation. FIG. 2b is another sectional view of the tool 14 rotating centralized within a borehole 34' of larger diameter, with a corresponding standoff 30'. For purposes of discussion, it is assumed that the density of the formation 32 remains constant. As the tool rotates, the LWD density system collects or "samples" counts in each detector. The sample time is selected to be relatively short interval when compared with the time required for one complete rotation of the tool. By selecting a short sample time interval, any variation in tool standoff, as will be shown in subsequent examples, is minimal. The statistical error associated with each sample is, however, large. This would yield a statistically insignificant bulk density measurement if the spine and rib technique or similar correction method were applied to each set of detector count rate samples.

Figure 2C:
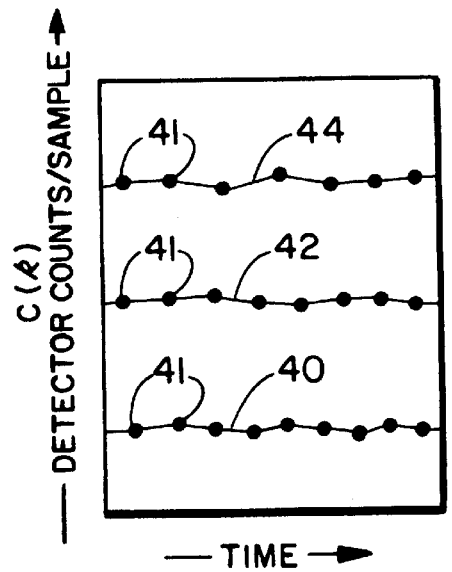
FIG. 2c is a plot of detector count sample intervals as a function of time for the tool operating with constant standoff in boreholes of three different diameters.

FIG. 2c shows detector count samples 41 plotted as a function of time. Curve 40 represents samples measured by one of the detectors 22 or 24 with the tool 14 rotating in the smaller borehole 24 as shown in FIG. 2a. The count rate in the short spaced detector 22 is typically greater than the corresponding count rate in the long spaced detector 24, but the behavior of both detector responses is the same. Curve 42 represents samples measured by the same detector with the tool rotating centralized in the larger borehole 34' as shown in FIG. 2b. These examples assume that the density of the formation is greater than the density of any intervening material within the tool standoff. Curve 44 represents samples measured by the same detector with the tool rotating centralized in a still larger borehole (not shown) with the density of the formation remaining constant. Since the tool 14 is rotating centralized and the standoff does not vary as a function of azimuthal position of the tool 14, the samples 41 for a given borehole size and formation density remain constant in time, within statistical variations, as shown in FIG. 2c.

Figure 3:
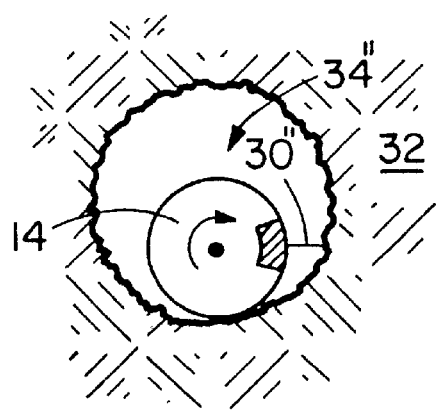
FIG. 3 is a sectional view of the tool operating in a borehole eccentered and with variable standoff.
Figure 5:
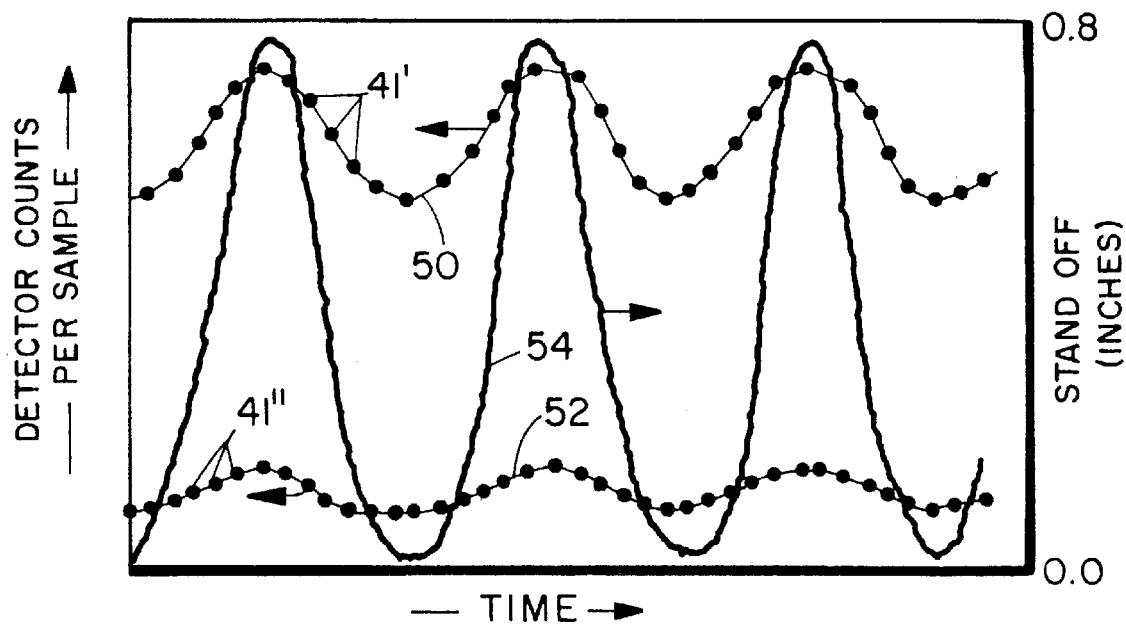
FIG. 5 is a plot as a function of time of long spaced detector count samples, short spaced detector count samples, and tool standoff with the tool operating eccentered in a borehole with varying standoff.

FIG. 3 is a sectional view of the tool 14 rotating eccenfered within a borehole 34". The standoff 30" of the instrument section 18 varies as the tool rotates. FIG. 5 is a plot of count samples 41' from the short spaced detector 22 with a smooth curve 50 being drawn through these points. Included also in FIG. 5 is a plot of count samples 41" from the long spaced detector 24 which, for given formation and borehole conditions, is typically lower than the corresponding short spaced detector samples 41'. A smooth curve 52 has been drawn through the count samples 41". Count samples are in arbitrary units for purposes of illustration, and are represented by the left hand ordinate of FIG. 5. FIG. 5 also illustrates a curve 54 representing the magnitude of the variable standoff 30" as the tool 14 rotates. For purposes of illustration, it is assumed that standoff 30" varies between 0.00 and 0.75 inches (in.) as denoted by the right hand ordinate. It is apparent that, for a given formation density and borehole condition, count samples from both long and short spaced detectors vary with standoff. In this example, standoff 30" monotonically increases as the tool 14 rotates to a maximum standoff 0.75 in. when the instrument section 18 faces the borehole wall opposite from the wall which the tool 14 contacts. Standoff 30" then monotonically decreases until the instrument package 18 contacts the wall of the borehole 34". This pattern repeats as the tool makes multiple rotations.

Still referring to FIGS. 3 and 5, count samples from both long and short spaced detectors 24 and 22 are collected and stored for a sample period which typically includes several hundred or more samples 41' measured over several rotations of the tool 14. It is desirable to make the sample period sufficiently long to minimize statistical error in the final density measurement, but also sufficiently short so that the change in true formation density seen by the tool is minimal during the advancing of the tool. Assume that the tool 14 is rotating at 120 revolutions per minute (rpm) and that the count samples 41' are collected every 50 milliseconds (ms). During each small sample of 50 ms, the standoff does not vary by more than 0.1 in. using the rather typical example shown in FIG. 5. A spine and rib type correction could handle such small standoff variation. The problem is, however the relatively small number of counts collected by the detectors 22 and 24 during each count sample 41', and especially in the long spaced detector 24 which is spaced further from the source 20. Statistical fluctuations of the data samples 41' will cause large errors in the corrected density if they are used as individual measurements in a spine and rib type correction.

It is noted that the invention does not require a rotating tool. In cases where a downhole motor such as "mud" motor is used to rotate the bit, or the density measurements are made as the drill string is being withdrawn from the borehole, techniques disclosed in this specification are equally applicable. A rotating drill string and tool are used for purposed of discussion.

Figure 4:
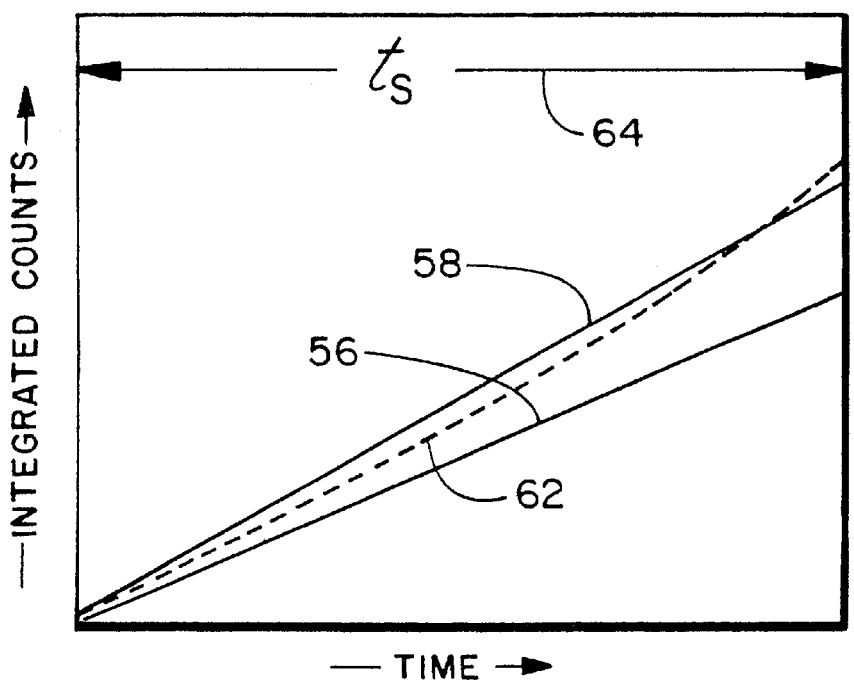
FIG. 4 illustrates running integrals of detector count intervals, after sorting by magnitude, plotted as a function of time with the tool operating with constant and varying standoffs.

The data processing system of the present invention greatly minimizes the problem of statistical variations of each count sample by fitting a curve to a running count integration or summation technique prior to determine apparent and finally compensated density values. Attention is directed to FIG. 4 which shows curves fitted to integrated segment counts or "integral counts" plotted as a function of time. Details of the running count integration and the fitting will be presented in a subsequent section of this specification. If the tool is operating centered within the borehole as shown in FIG. 2a or 2b, a fitted curve will be linear over a selected sample period $t_s$ shown at 64. For a given formation density, line slope will be a function of standoff. As an example, the tool 14 operating in a smaller borehole as shown in FIG. 2a will result in a linear curve 56 which has a smaller slope than a linear curve 58, which is obtained with the tool operating in a larger borehole 34' as shown in FIG. 2b. A nonlinear curve of the form 62 is obtained when the tool is operating eccentered within a borehole as shown in FIG. 3. Count samples are preferably integrated for both detectors, although the method is applicable to only a single detector. As an example, an integral of count segments 41" for the long spaced detector shown in FIG. 5 will yield a curve of the form 62 shown in FIG. 4. Likewise, an integral of counts 41' from the short spaced detector will also yield a curve of the form 62, but with greater absolute integral counts per unit time and with a greater slope.

The slope of each segment curve is also a function of apparent formation density that the detector "sees". Stated another way, each segment is a function of both formation density and tool standoff.

To summarize, a running integral of count samples from each detector over a sample period $t_s$ will yield a curve with a shape indicative of constant or varying tool standoff, the magnitude of the standoff, and the "apparent" density of material which the detector "sees". The use of this information to obtain accurate and statistically compensated bulk density formation values will be developed in the following sections. The integration and fitting method provides results with much less statistical variation than would be obtained using individual count samples measured by the detectors.

3. Specifics of the Data Processing

Assume that for a given detector, count samples are collected over a relatively short time interval $\Delta t$, where $\Delta t$ is 50 ms. Count samples are accumulated preferably contiguously over the entire sample period $t_s$ which contains n time intervals $\Delta t$. As an example, if n=100, $t_s$=5.0 seconds (s). The sample counts collected during $t_s$ are next sorted by magnitude yielding count samples c(k) ranging from c(1) which is the smallest to c(n) which is the largest. The following nomenclature will be used in describing the data processing:

$$I(p) = \Sigma I(k-1) + c(k) \quad (1)$$

where $$k = (1, 2, 3, \ldots, p-1, p)$$

Starting at p=1

$$I(1) = c(1)$$

$$I(2) = I(1) + c(2)$$

$$I(3) = I(2) + c(3)$$

*
*

$$I(p) = I(p-1) + c(p)$$

*
*

$$I(n-1) = I(n-2) + c(n-1)$$

$$I(n) = I(n-1) + c(n)$$

Using this sorting and integration method, I(p) is always greater than I(p−1). A plot of I(p) as a function of corresponding time intervals $\Delta t$ is shown in a hypothetical and somewhat exaggerated illustration in FIG. 6. The points 43 represent the sorted and integrated count samples I(p) encompassing p=1 to n, over the entire time segment $t_s$ (shown at 64) of preferably several seconds. Only a few I(p) points 43 are shown for clarity of the illustration. A nonlinear curve 68 is drawn through the data points 43 to illustrate a LWD tool operating with varying standoff as shown in FIGS. 3 and 5. If the tool were operating with a constant standoff as shown in FIGS. 2a and 2b, the curve would be linear and of the form 56 or 58 shown in FIG. 4.

Figure 6:
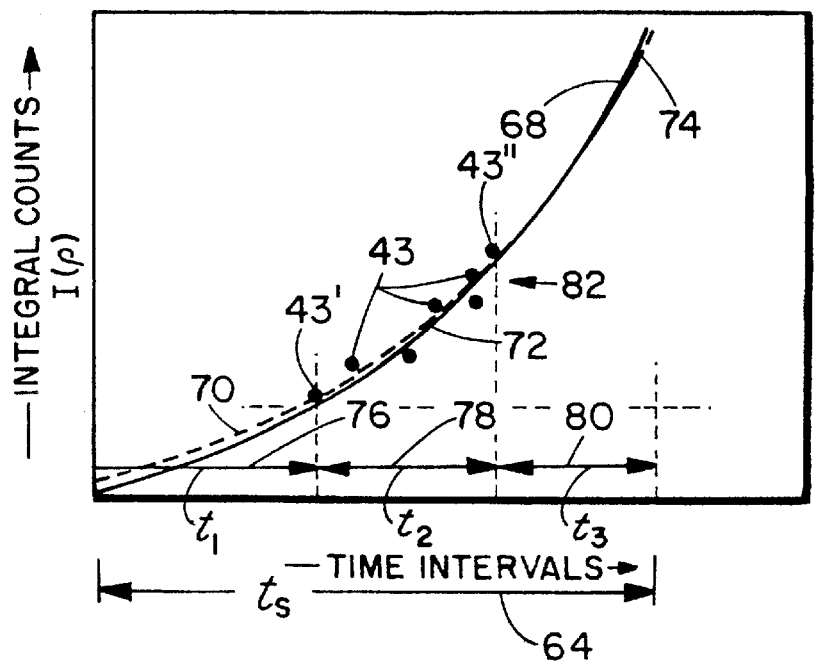
FIG. 6 illustrates the line segment fitting method of the invention.

Still referring to FIG. 6, a straight line 70, shown as a broken line, is fitted to the first h values of I(p) where p=1, . . . , h, and a goodness of fit parameter is obtained such as chi-square. If the fit parameter is less than a predetermined fit value, another point I(h+1) is added and a new fit parameter is obtained. This process is repeated until the fit parameter exceeds the predetermined fit value, and the first straight line segment 70 is thereby determined. The segment spans a time interval $t_1$ shown at 76. The entire process is again repeated starting with the specific value of I(p) identified as 43', and a second straight line segment 72 is thereby determined which spans a time interval $t_2$ shown at 78. The entire process is yet again repeated starting with a specific value of I(p) identified as 43", and ending with the final value I(n) in the yielding a third straight line segment 74, which spans the time interval $t_3$. In the hypothetical example shown in FIG. 6, three straight line segments 70, 72 and 74 are fitted to all of the data I(p) falling within sample period $t_s$. Stated another way, the integration and fitting process is stopped at the termination of the time segment $t_s$ shown at 64. If the standoff does not vary as reflected in the data in FIG. 2c and reflected in the curves 56 and 58 of FIG. 4, only a single straight line segment will be fitted to a plot of I(p) versus time intervals.

Count data c(k) within each line segment are summed. Each sum from each detector contains both density related and standoff related information. Density values not corrected for standoff, known as "apparent" density values, are next determined from the count sums from both the long and short spaced detectors. It should, however, be understood that the method is applicable to only one detector response. It is preferred, however, to process both detector responses to increase statistical precision as will be shown in a subsequent section of this specification. It is also preferable to convert the count sums to count rates using the time intervals over which they span, such as intervals 76, 78 and 80 shown in the example of FIG. 6. The apparent density $\rho_{LS}$ for the long spaced detector is $$\rho_{LS} = (\ln(R_{LS}/C_{LS})/D_{LS}) \quad (2)$$

and for the short spaced detector is $$\rho_{SS} = (\ln(R_{SS}/C_{SS})/D_{SS}) \quad (3)$$

where $R_{LS}$=the count rate obtained from the appropriate linear segment of the long spaced detector response;

$R_{SS}$=the count rate obtained from the appropriate linear segment of the short spaced detector response; and $C_{XS}$ and $D_{XS}$ (X=L,S) are constants functions of detector location and other tool parameters which are determined by calibrating the tool in formations with known densities.

Figure 7:
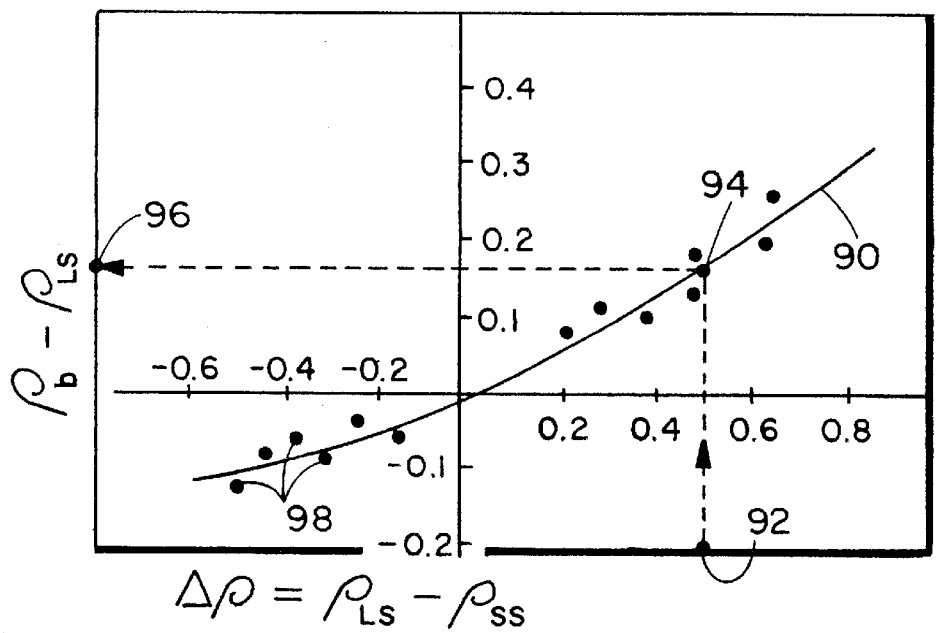
FIG. 7 is a graphical illustration of the spine and rib method for determining density values compensated for tool standoff.

Compensated bulk density, $\rho_b$, is next computed from apparent long and short spaced detector densities using preferably the spine and rib technique. FIG. 7 illustrates graphically the basic concepts of the technique, and consists of a plot of $\rho_b-\rho_{LS}$ on the ordinate verses $\rho_{LS}-\rho_{SS}$ on the abscissa. Data points 98 represent values determined from the various line segments discussed above, and fall within statistical precision along a curve 90. The quantity $\rho_{LS}-\rho_{SS}$ is computed from measured quantities using equations (2) and (3), entered at 92 on the origin, and a broken line is extended vertically until it intercepts the curve 90 at point 94. A horizontal line is then extended from the point 94 until it intersects the ordinate at 96 yielding a value of $\rho_b-\rho_{LS}$. Since $\rho_{LS}$ is known from equation (2), the quality of interest $\rho_b$ can be computed. Although the illustrated solution is graphical, it should be understood that $\rho_b$ is computed from appropriate spine and rib or other suitable standoff algorithms using a data processing means. The statistical precision of $\rho_b$ is also determined at this point, and details of this process will be discussed in a subsequent section of this specification. For a vertical increment of well borehole, values of $\rho_b$ determined above from each line segment are statistically weighted, and a compensated bulk density $\rho_B$ for that segment of borehole is obtained by combining weighted values of $\rho_b$. Weighting can be based upon statistical precision of $\rho_b$, or on the magnitude of the corresponding standoff, or any other meaningful statistical weight indicator.

As the tool is conveyed along the borehole, the earliest or most "up-hole" value of c(k) is dropped, a new value of c(k) is applied to span fully the time interval $t_s$ with data. The entire integration, fitting, weighting process is repeated thereby yielding a log of as a function of depth in the borehole.

4. Accuracy and Precision

In order to illustrate the accuracy of the method, it is necessary to consider how statistical fluctuations of the detector counts propagate into the corrected formation density calculation.

The corrected bulk density is generally given by:

$$\rho_c = \rho_{LS} + A(\rho_{LS}-\rho_{SS}) + B(\rho_{LS}-\rho_{SS})^2 \quad (4)$$

where $\rho_c$ is the corrected density, $\rho_{LS}$ is the apparent density of the long-spaced detector, $\rho_{SS}$ is the apparent density of the short-spaced detector, and A and B are empirical coefficients functions primarily of tool design. The above equation is a general expression for corrected bulk density, therefore it is expressed in terms of $\rho_c$ rather than $\rho_b$. The apparent detector density is calculated from:

$$\rho_{XS} = (1n(R_{XS}/C_{XS}))D_{XS}$$

where $R_{XS}$ is the count rate of the X-spaced detector (X=L or S) and $C_{XS}$ and $D_{XS}$ are constants functions of detector location and other tool parameters. These two constants are determined by calibrating the tool in formations with known densities. Assuming that the statistical precision of the detector counts is equal to the square root of the counts, the statistical error in the apparent detector density is given by:

$$\sigma(\rho_{XS}) = \sigma(R_{XS})/(D_{XS}R_{XS}) = 1/(D_{XS}(t\ R_{XS})^{1/2})$$

where t is the sampling time is seconds. In these examples, $D_{SS}$ is about 0.3 and $D_{LS}$ is about 2.2. The statistical precision of the corrected density can then be derived from basic principles and is given by:

$$\sigma(\rho_C) = ([(\sigma^2(\rho_{LS}))^2(\partial\rho_C/\partial\rho_C)^2] + [(\sigma^2(\rho_{SS}))^2(\partial\rho_C/\partial\rho_{SS})^2])^{1/2}$$

$$\partial\rho_C/\partial\rho_{SS} = -A - 2B(\rho_{LS}-\rho_{SS})$$

$$\partial\rho_C/\partial\rho_{LS} = (1+A) + 2B(\rho_{LS}-\rho_{SS})$$

For any given number "n" of incremental corrected samples, the corrected formation density, $\rho_{C,AVE}$, is calculated from the sample densities $\rho_{Ci}$ and weighted with the standard deviations $\sigma_{Ci}$ using the relationship $$\rho_{C,AVE} = \left[\sum_{i=1}^{n}(\rho_{Ci}/\sigma_{Ci}^2)\right] / \left[\sum_{i=1}^{n}(1/\sigma_{Ci}^2)\right]$$

To access the precision and accuracy of the method, two alternative methods are presented as comparisons with the disclosed method of processing count data and determining compensated or corrected bulk formation density:

Method A

The apparent and corrected densities $\rho_{Ci}$ (i=1 ..., n) for each small sample are calculated and then numerically averaged. If the data has no statistical fluctuations, this method will produce the best estimate of formation density since there is virtually no variation in standoff of each sample. Conversely, if the data has large statistical fluctuations, this method will be statistically unstable and will produce erroneous results.

Method B

The count data c(i) for both long and short spaced detectors are summed for the entire time period $t_S$, and apparent and corrected densities are determined from the summations of the count data. If standoff does not vary during the time interval $t_S$, this method should be both statistically stable and accurate. Conversely, if standoff changes significantly within the time interval $t_S$, the method will produce erroneous results despite statistical precision.

Two different operating examples are considered in evaluating accuracy and statistical precision:

EXAMPLE 1

An 8 in. diameter tool is rotating in place in a 8.75 in. diameter borehole resulting in continuous variation in standoff from 0.00 in. to 0.75 in. similar to the situation depicted in FIG. 5. The rotation speed is assumed to be 120 rpm, data is sampled at a time interval $\Delta t = 50$ ms, and the sampler period is $t_S = 5$ s.

EXAMPLE 2

Figure 8:
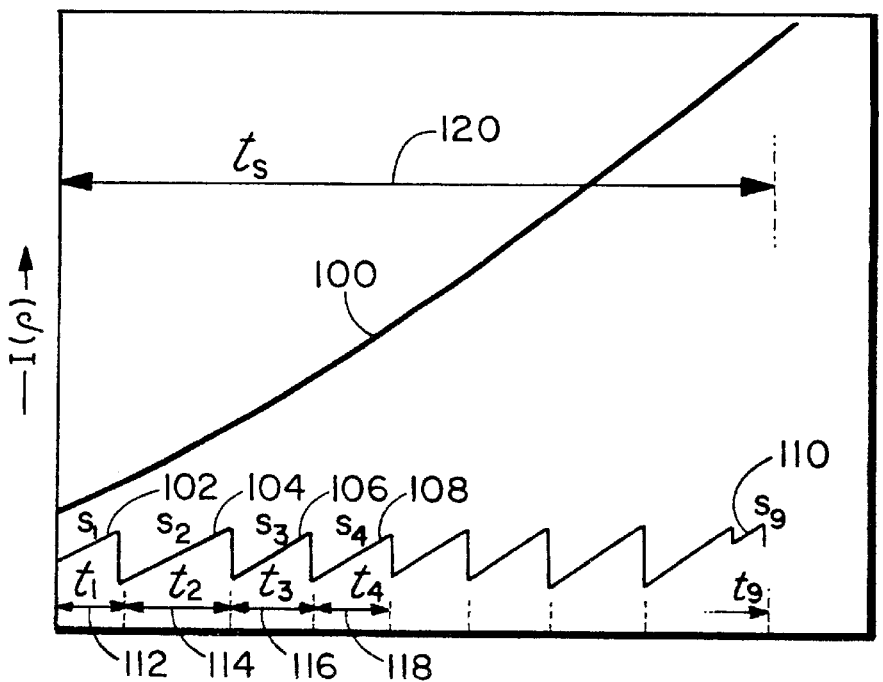
FIG. 8 illustrates the segmentation of a time segment of data with the tool operating with varying standoff.

An 8 in. diameter tool is rotating in place in a 8.75 in. diameter borehole. This standoff in this example is varying randomly as shown in FIG. 8, (rather than contiguously as in example 1), from 0.00 in. to 0.75 in. Data is again sampled at a time interval $\Delta t_S = 50$ ms, and the sample period is $t_S = 5$ s.

For each method and each example, 100 "test cases" comprising sample periods of $\Delta t$ 50 ms were taken to obtain a fair assessment of statistical variation and accuracy, with accuracy being defined conventionally as a comparison between the magnitudes of measured and true formation density. In both examples, it is assumed that the true formation density is 2.71 grams/cubic centimeter (g/cm³) and the borehole is filled with a mud of density 1.25 g/cm³. Random Guassian statistics plus 1% random noise were added to the data to simulate realistic LWD conditions. Apparent densities were corrected using the spine and rib method.

Figure 11:
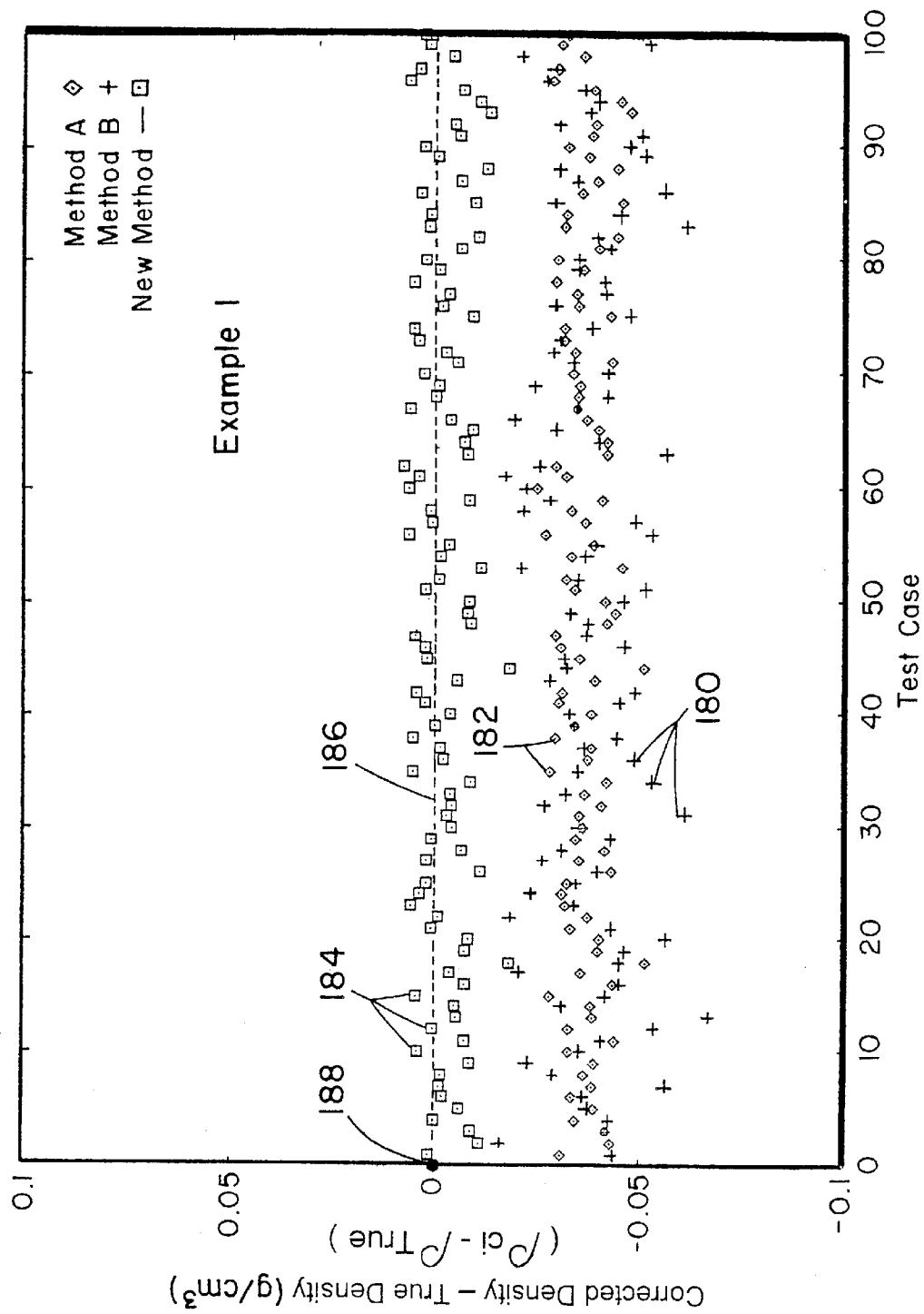
FIG. 11 illustrates precision and accuracy of the present data processing method, compared with two other data processing methods, for periodically varying tool standoff.

FIG. 11 illustrated the results of the three methods of processing measured count data for example 1. The difference in computed density and true formation is plotted as a function of test case. Diamond points identified as 182 represent results using method A. Crosses identified as 180 represent results using method B, and the squares identified as 184 represents results obtained using the previously discussed methods of the present invention. A broken line 186 represents the situation in which measured density equals true density, as denoted by the point 188 plotted at zero on the measured versus true ordinate. Examining the plot, it is apparent from the point scatter that all three methods yield essentially the same precision, regardless of how the individual test cases are binned and whether binning is done prior to or after correction. In terms of accuracy, the method of the present invention yields superior results with an average deviation from the true density of about 0.002 g/cm$^3$ and a maximum error of 0.018 g/cm$^3$. Summing the data regardless of the standoff (method B) has an average accuracy of 0.04 g/cm$^3$ deviation from true formation density, and a maximum error of about 0.067 g/cm$^3$. This is about two to three times greater that what is considered generally acceptable for this type of measurement. Correcting every small test case sample and then averaging the corrected density data (method A) also shows poor accuracy of about 0.036 g/cm$^3$ deviation from true density, with a maximum error of about 0.052 g/cm$^3$ when compared with methods A and B.

Figure 12:
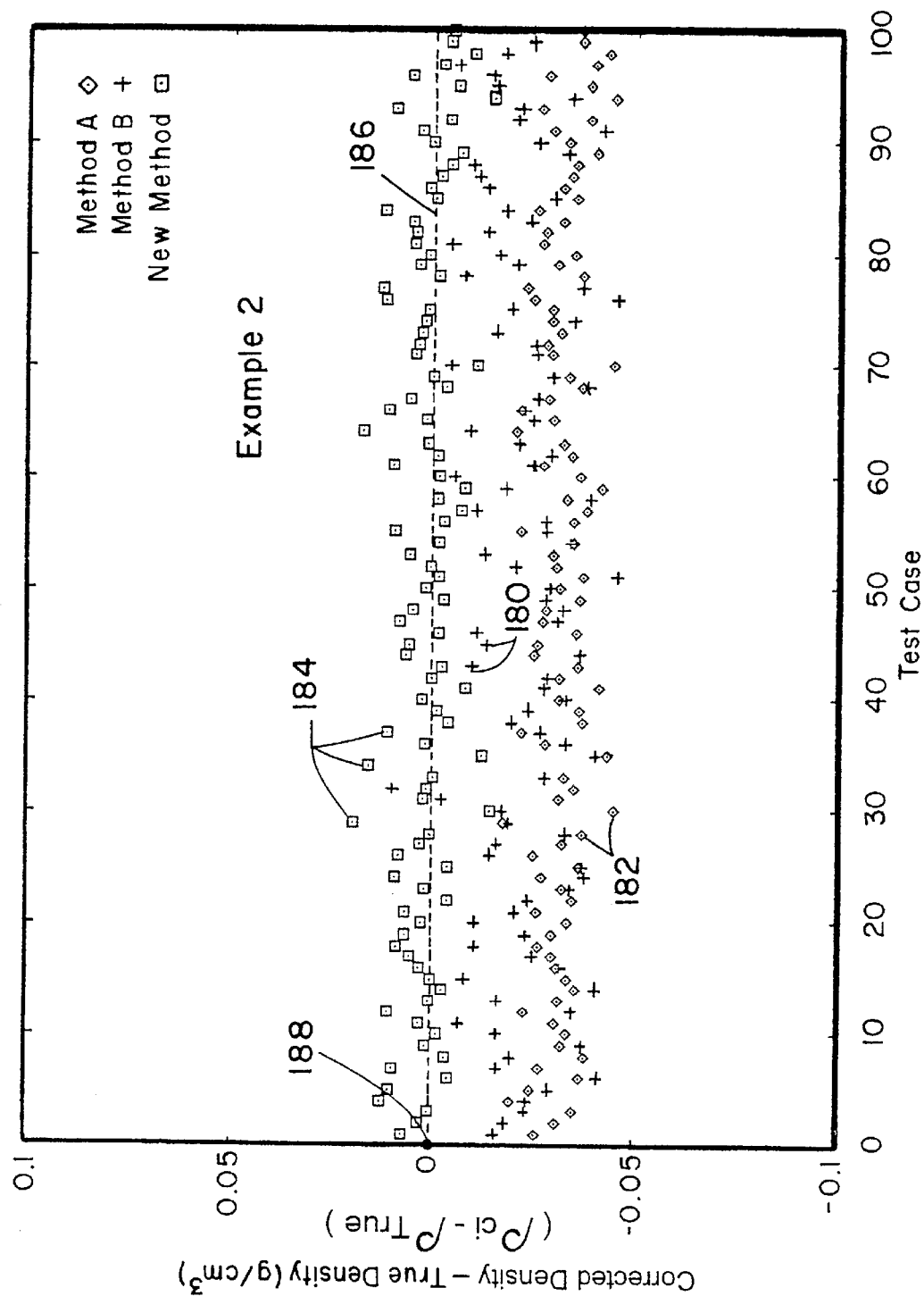
FIG. 12 illustrates precision and accuracy of the present data processing method, compared with two other data processing methods, for randomly varying tool standoff.

FIG. 12 illustrates the results obtained using the three data processing methods for example 2. Once again, the difference in computed density and true formation is plotted as a function of test case, diamond points identified as 182 represent results using method A, crosses identified as 180 represent results using method B, and squares identified as 184 represents results obtained using the methods of the present invention. The broken line 186 again represents the situation in which measured density equals true density, as denoted by the point 188 plotted at zero on the measured versus true ordinate. Again, all three methods yield essentially the same precision. The methods of the present invention yield superior accuracy results with an average deviation from the true density of about 0.002 g/cm$^3$ and a maximum error of 0.019 g/cm$^3$. Method A has an average accuracy of 0.036 g/cm$^3$ deviation from true formation density, and a maximum error of about 0.046 g/cm$^3$. Method B has an accuracy of about 0.020 g/cm$^3$ deviation from true density, with a maximum error of about 0.045 g/cm$^3$. It is apparent that method B is more accurate in example 2 than in example 1. The reason for the difference lies in the standoff patterns used in the two examples. In the second example, standoff is equally distributed between 0.00 in. and 0.75 in. In the first example, the standoff distribution is skewed toward the very low and the very high standoffs. About 33% of the data were at a standoff between 0.00 in. and 0.15 in., 30% of the data were between 0.60 in. and 0.75 in., and only 37% of the data were between 0.15 in. and 0.60 in. Since the effects of standoff on detector counts is fairly linear while the relationship between the detector counts and formation density is exponential, summing data from such a distribution results in an erroneously high count rate and hence a lower calculated formation density.

5. Azimuthal Logs

FIG. 8 shows the modeling data obtained in the second example discussed above for a sample time $t_s$5 s as shown at 120. The integration method yields the monotonically increasing curve 100. The fitting process yields nine straight line segments $S_i(i=1, \ldots, 9)$. $S_1, S_2, S_3, S_4$ and $S_9$ are shown at 102, 104, 106, 108 and 110, respectively, as examples. The time duration $t_i$ of the respective samples are shown at 112, 114, 116, 118 and 120, respectively. As mentioned previously, the segments $S_i$ contain information not only related to density, but also related to the magnitude of the standoff corresponding to that segment. From the data shown in FIG. 8, the following standoff values for each segment can be computed and are tabulated in Table 1.

TABLE 1

| $S_i$ | $t_i$ | Average Standoff (in) |
|---|---|---|
| 1 | 0.48 | 0.025 +/− 0.005 |
| 2 | 0.77 | 0.056 +/− 0.007 |
| 3 | 0.59 | 0.129 +/− 0.012 |
| 4 | 0.62 | 0.265 +/− 0.013 |
| 5 | 0.57 | 0.387 +/− 0.015 |
| 6 | 0.60 | 0.552 +/− 0.014 |
| 7 | 0.68 | 0.635 +/− 0.011 |
| 8 | 0.65 | 0.695 +/− 0.007 |
| 9 | 0.14 | 0.733 +/− 0.006 |

In the discussion above, compensated bulk density $\rho_b$ from each line segment $S_i$ for each detector is computed, and a weighted average based upon the magnitude of each segment standoff is used to compute $\rho_B$, which is the bulk density for the vertical interval of borehole.

Parameters produced by the methods of the invention can be used to generate azimuthal logs of $\rho_b$ as a function of depth within the well borehole. The time values $t_i$ are indicative of the relative time the tool spends within the borehole at the corresponding standoff if it is assumed that the rotation of the bit is constant. Values of variable standoff as shown in Table 1 can be combined with the time intervals $t_i$ to map a cross section of the borehole. The above parameters are of particular interest in LWD in deviated well boreholes, and can be used to "geosteer" the drill bit.

Figure 9:
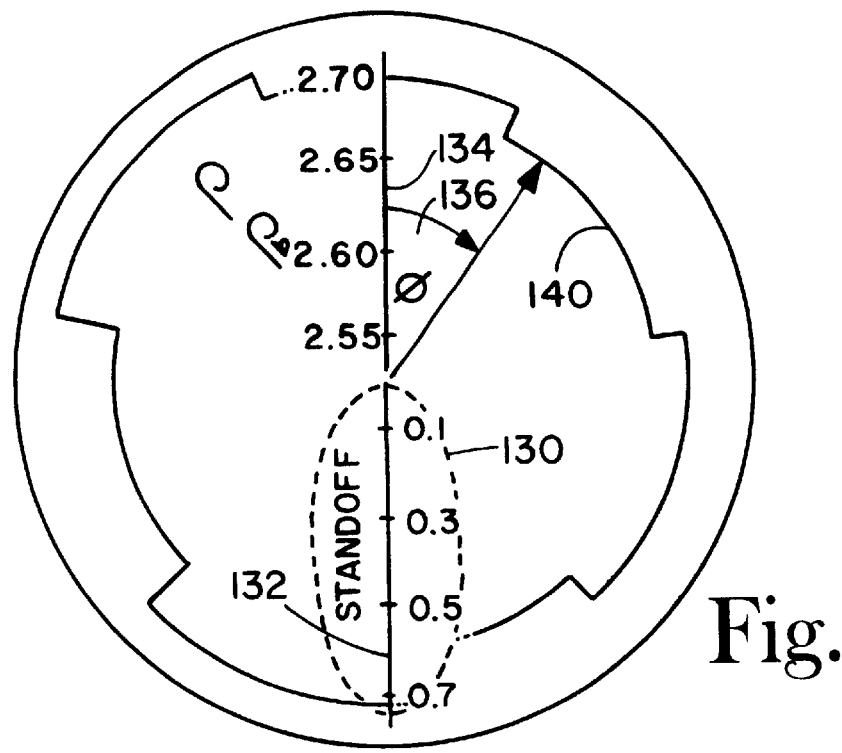
FIG. 9 illustrates azimuthal density and azimuthal standoff measurements that can be obtained with the invention.

Attention is directed to FIG. 9 which is a polar plot of the data in Table 1. For purposes of discussion, assume that the data represents integer number of tool revolutions over a given depth increment of borehole. As an example, the sum of all values of $t_i$ is approximately 5 s (i.e. $t_s$=5 s). At a bit rotation of 120 rpm, the data would represent approximately 10 revolutions. Segment 1 therefore represents an azimuthal segment of borehole of approximately 34 degrees, segment 2 and azimuthal segment of approximately 54 degrees, and so forth. The broken curve 130 represents the standoff variation as a function of a reference angle $\phi$ shown at 136. The standoff varies between 0.025 in. to 0.733 in. using the scale 132. Also shown are corresponding values of corrected formation density $\rho_b$ for each segment $S_i$, represented by the curve 140 and the density scale 134.

FIG. 9 is intended to illustrate the types of tool position operation information and azimuthal density information that can be obtained from the methodology of the invention. As an example, a "map" of the borehole with respect to the position of the tool can be generated using azimuthal standoff data. This map, if combined with a measure of tool position within the borehole using independent means such as rate gyros and inclinometers, can be used to generate a true map of the borehole wall. The standoff information shown in the curve 130 can also be used to correct other LWD logging systems for standoff, such as a neutron porosity log.

It is also noted that gamma ray energy spectra can be measured with one or both of the detectors 22 and 24 (see FIG. 1). Ratios of various energy regions or energy windows can be used to measure the photoelectric factor (PF) of each azimuthal segment represented by each segment $S_i$, which in turn can be used to extract the lithology of the formation. A weighted average similar to that used to combine values of $\rho_b$ to obtain $\rho_B$ can also be used to obtain a weighted azimuthally averaged value of PF for the entire segment of borehole.

6. Data Processing Flow Chart

Figure 10:
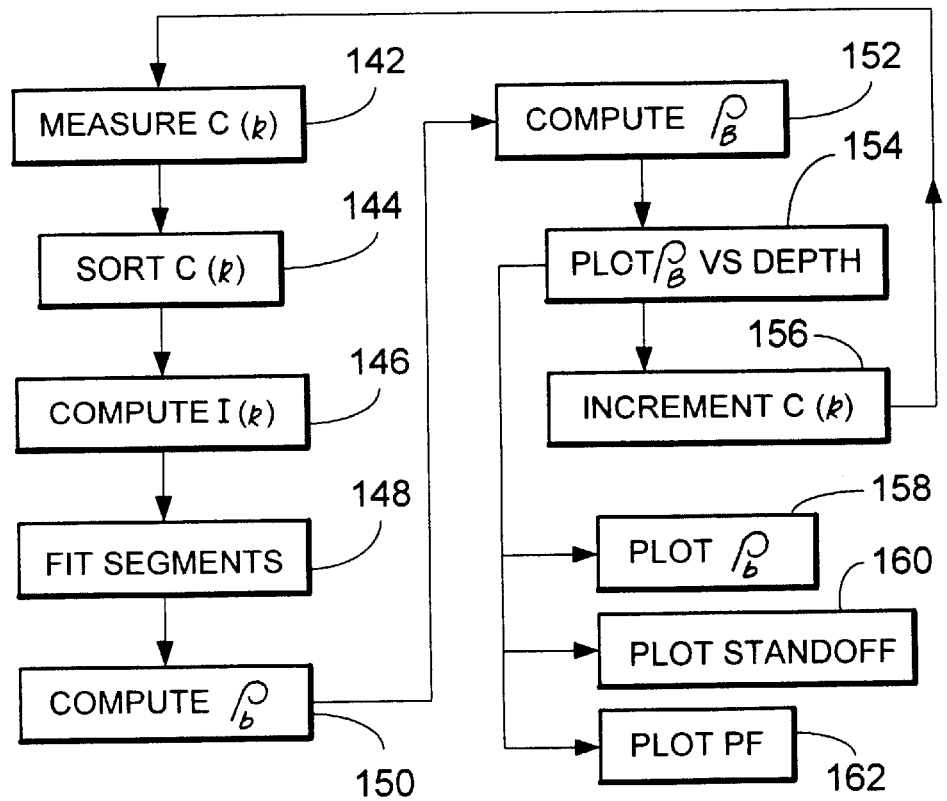
FIG. 10 is a simplified flow chart of data measurement and processing steps.

The previously discussed data processing method for the density tool is summarized in the flow chart of FIG. 10. The values of c(k) within the time interval $t_S$ are measured at 142. Values of c(k) are sorted by magnitude at 144 and arranged in increasing magnitude. The running integral sums I(k) are computed at 146, and straight line segments are fitted at step 148. At step 150, values of c(k) for each straight line segment $S_i$ are summed, apparent long spaced and short spaced densities are computed, and a corrected bulk density value $\rho_b$ for each segment is computed. A weighted average value of the values of $\rho_b$ is computed at step 152 yielding an azimuthally weighted averaged bulk density value $\rho_B$ for a vertical interval of borehole. As the LWD tool advances the borehole, the earliest value of c(k) is discarded, a new value is measured completing the number of sample counts within ts, and processing returns to the step 142. This process continues until the drilling operation is completed thereby yielding a log of $\rho_B$ as a function of depth.

As alternate processing steps, azimuthally segmented values of corrected density, namely, $\rho_b$, can be plotted as a function of depth at step 158. Another alternate processing step is the plotting of standoff distance as a function of azimuthal segment and depth at step 160. Yet another alternate processing step is the plotting of PF as a function of depth at step 162. Additional density processing methods will be discussed in detail in a subsequent section of this disclosure.

7. Polar Plots of Density

Corrected density logs of predetermined sectors of the borehole can be obtained using the methodology of the present invention. As an example, the borehole can be divided to four quadrants. It is also desirable to know the absolute orientation of the quadrants. Most MWD and LWD drilling strings convey some type of directional package which is used to define the path of the well bore and the position of the drill bit. The directional package can, therefore, be used to obtain absolute orientation of the preselected borehole quadrants.

Figure 13:
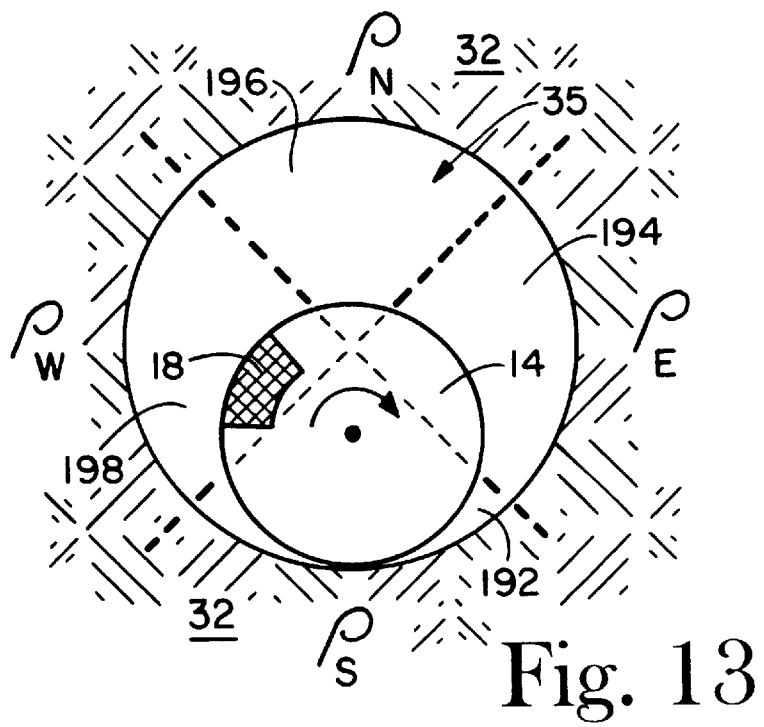
FIG. 13 is a sectional view of a tool operating within a borehole for which predetermined azimuthal segments have been defined.

FIG. 13 shows a sectional view of a borehole 35 which has been sectioned into four quadrants. Alternately, the borehole can be partitioned into any number of equal or non-equal segments. The segments do not necessarily need to be contiguous. For purposes of discussion, assume that directional information is available, and that quadrants 196, 194, 192 and 198 are centered at true north, east, south and west, respectively. Once again, a tool 14 is shown rotating within the borehole 35 and the density instrument rotates through all four quadrants. Detector responses are first sorted according to the quadrant in which they are measured. Apparent segment formation densities are obtained for each segment, with a weighted average of two or more apparent subsegment formation densities being used if two or more linear segments are fitted to data measured within a given azimuthal segment. Using the methodology described in detail in the previous sections of this specification, and summarized as a functional flow chart in FIG. 10, standoff compensated density values $\rho_N$, $\rho_E$, $\rho_S$ and $\rho_W$ are then determined from for the formation 32 the quadrants 196, 194, 192 and 198, respectively.

Azimuthal density measurements have many uses. Differing quadrant densities can indicate a highly nonhomogeneous formation 32. As a second example, differing quadrant densities can indicate that a formation bed boundary is being penetrated at an angle by the borehole 35. There are other applications of azimuthal density measurements which are known in the art.

Figure 14:
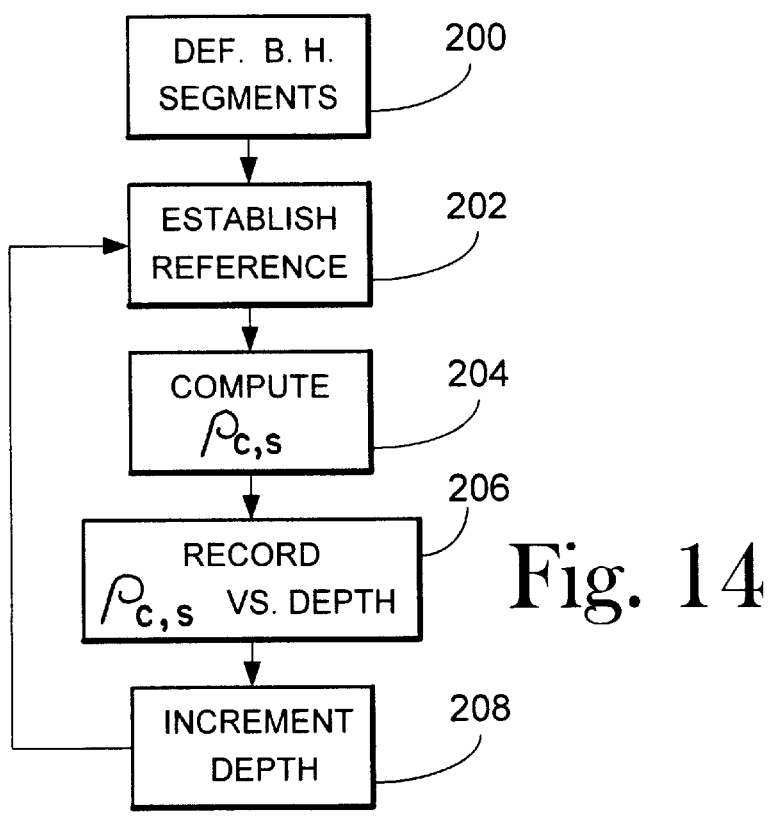
FIG. 14 is a flow chart of steps used to obtain compensated density measurements as a function of depth for predetermined segments of borehole.

FIG. 14 is a flow chart summarizing the azimuthal density measurement. The borehole is segmented at step 200. As mentioned above, the method is not limited to quadrants, but can comprise any number of azimuthal segments that may be equal or unequal in value. An absolute reference of the tool is established at 202 preferably using information from a directional package conveyed in the drill string. Compensated formation density is computed at 204 using techniques summarized in the flow chart of FIG. 10. Compensated density for each selected segment is recorded as a function of depth within the borehole at 206. Depth is incremented at 208 and the sequence is repeated starting at step 202.

8. Azimuthal Measurements Based Upon Segments of Constant Density

The basic methods of tool standoff compensation discussed above can be refined to account for azimuthal changes in formation density. The nomenclature and indexing convention introduced in section 3 of this disclosure will again be used.

Figure 15:
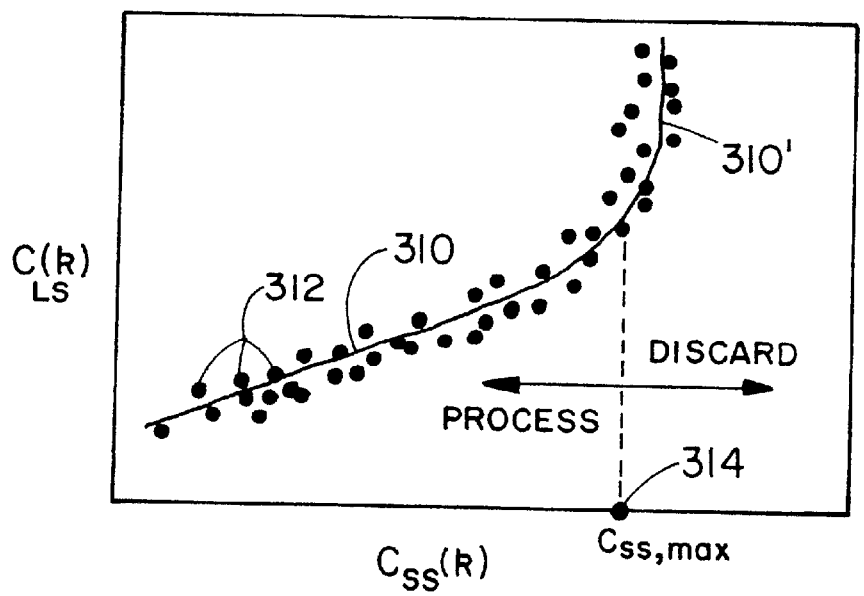
FIG. 15 is a plot of short spaced detector count rates as a function of long spaced detector count rates over a wide variation of tool standoffs.

In general, the spine and rib method is effective for correcting for standoff values of 1.5 in. or less. In LWD applications, standoff values of 2 in. to 3 in. or greater can be encountered. Data measured in segment which encounter these large standoffs are, therefore, essentially meaningless and should be discarded before general data processing is initiated. FIG. 15 illustrates segment k count rate data $C_{LS}(k)$ measured with the long spaced detector plotted as a function of the corresponding segment k count rate data $C_{SS}(k)$ measured with the short spaced detector after the data from the two detectors have been sorted according to the long spaced detector count rate. These points are identified by the numeral 312. The density of material within the borehole is typically less than the density of the formation. Furthermore, $C_X(k)(X=LS$ or $SS)$ tends to increase as the composite density that the detector "sees" decreases. As standoff increases, both $C_{SS}(k)$ and $C_{LS}(k)$ will increase as illustrated by the section 310 of smooth curve drawn through the data points 312. As standoff continues to increase, the short spaced detector, which has the shallower radial depth of investigation, will eventually respond only to the borehole material and $C_{SS}(k)$ will, therefore, cease to change with increasing standoff. The long spaced detector, with the greater depth of investigation, will continue to increase. This is illustrated by the portion 310' of the curve drawn through the data points 312. The data points 312 with $C_{SS}(k)$ greater than a value 314 and designated as a "threshold" value $C_{SS,MAX}$ are, therefore, physically meaningless. These data are, therefore discarded from subsequent data processing. It should be understood that other criteria could be used to establish a threshold to discard physically meaningless data. As examples, all data 312 can be discarded when the curve drawn through the data exceeds a predetermined slope, or when $\delta C_{LS}(k)/\delta C_{SS}(k)$ exceeds a certain predetermined value.

Figure 16:
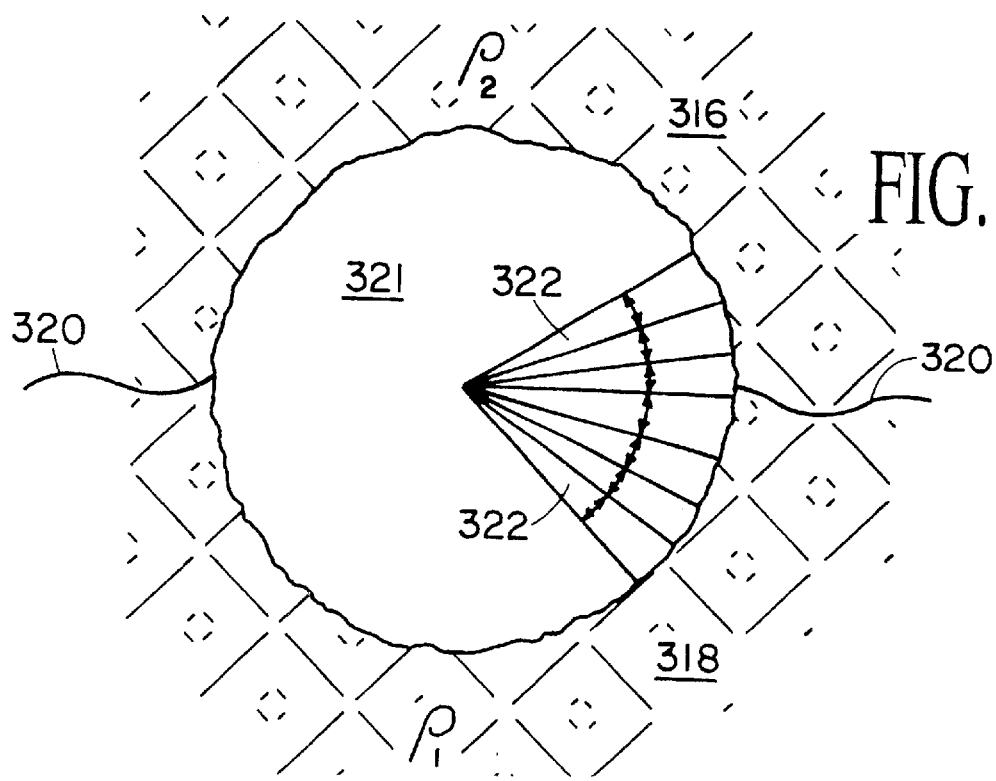
FIG. 16 is a conceptualized cross section of a borehole penetrating a formation of varying azimuthal density.

FIG. 16 illustrates a cross sectional view of a borehole 321 penetrating a formation 318 of azimuthal density $\rho_1$ on one side and a formation 316 of density $\rho_2$ on the opposing side. The formations interface at 320. Segments $S_i$ identified at 322 represent segments swept by the tool during previously defined time segments $t_i$. The illustration is highly conceptualized, and is used for purposes of illustrating data processing methods.

Figure 17:
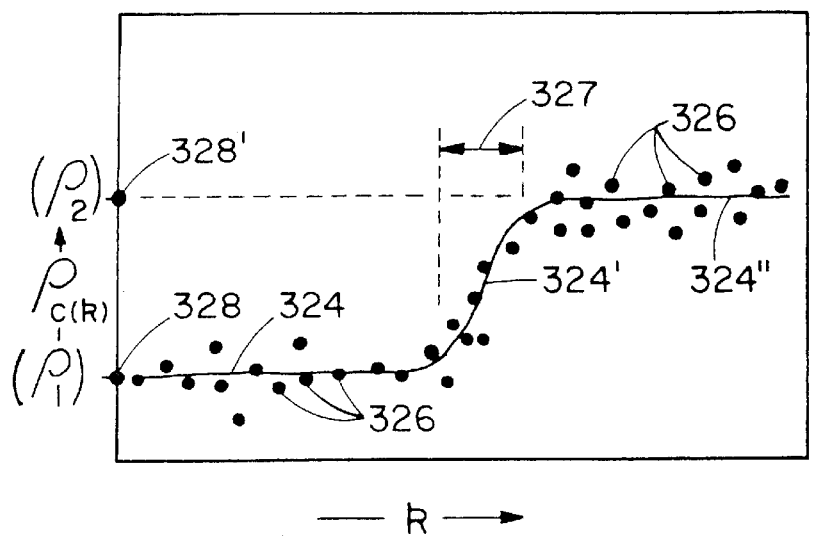
FIG. 17 is a plot of incremental compensated density values measured in a borehole with two azimuthal densities and sorted by magnitude.

Count rate data $C_{SS}(k)$ and $C_{LS}(k)$ are recorded, and physically insignificant data is discarded as discussed above and as illustrated in FIG. 15. For the remaining data, corrected densities $\rho_c(k)$ for each of n time intervals $\Delta t$ are calculated from the long and short spaced density detector responses $C_{SS}s(k)$ and $C_{LS}(k)$, using equation (4), and then sorted by magnitude. FIG. 17 illustrates a plot of $\rho_c(k)$ as a function of k for the borehole geometry shown in FIG. 16. For segments 322 encompassing formation with density $\rho_1$, points 326 fall around a portion 324 of a curve drawn through the data and intersecting the ordinate at a point 328 representing $\rho_1$. For segments 322 encompassing formation with density $\rho_2$, points 326 fall around a portion 324" of a curve drawn through the data and projecting to the ordinate at a point 328' representing $\rho_2$. For segments in which the detectors "see" the interface 320 and therefore respond to formations of both densities $\rho_1$, and $\rho_2$, points 326 fall around a portion of curve 324' in a transition zone 327.

The count rates $C_{SS}(k)$ and $C_{LS}(k)$ are small in magnitude and, therefore exhibit large statistical uncertainties. These large statistical uncertainties are propagated into the corresponding calculations of $\rho_c(k)$. Statistical precision of the azimuthal density measurements is maximized by determining formation density segments of constant magnitude using the same basic method used to determine segments of constant standoff. The values $\rho_c(k)$ are sorted by magnitude, and the sorted values are defined as $\rho(p)$.

Figure 18:
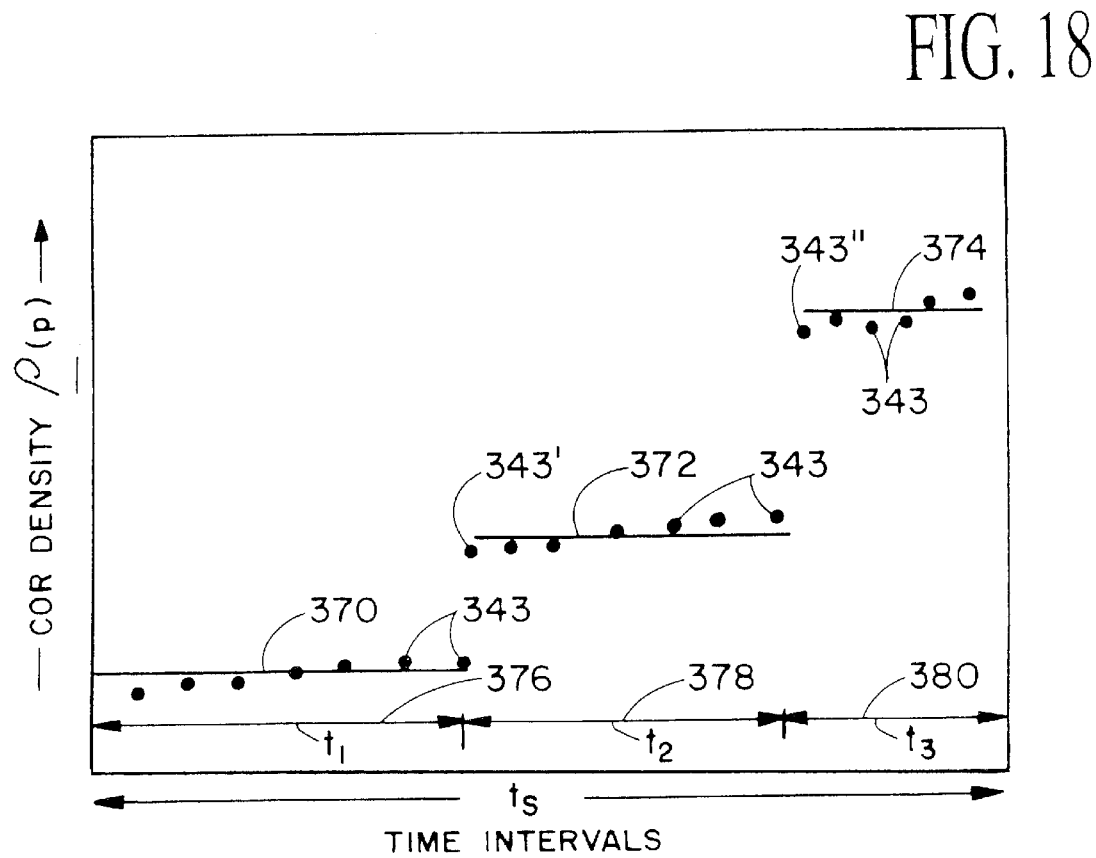
FIG. 18 illustrates the line segment fitting method to determine regions of constant azimuthal density.

A plot of $\rho(p)$ as a function of corresponding time intervals $\Delta t$ is shown in a hypothetical illustration in FIG. 18. Points 343 represent the sorted samples $\rho(p)$ encompassing p=1 to n, over the entire time segment $t_S$ shown at 364. Only a few $\rho(p)$ points 343 are shown for clarity.

Still referring to FIG. 18, a horizontal line 370 is fitted to the first h values of $\rho(p)$, preferably using the least squares fit method, where p=(1, . . . ,h). A goodness of fit parameter is obtained, such as chi-square. If the fit parameter is less than a predetermined fit value, another point $\rho(h+1)$ is added and a new fit parameter is obtained. This process is repeated until the fit parameter exceeds the predetermined fit value. This is illustrated conceptually by the point 343'. A first horizontal line segment 370 is fitted to these data representing a sector of constant density. The segment spans a time interval $t_1$, shown at 376. The entire process is again repeated, starting with the specific value of $\rho(p)$ identified as 343', and continued until the fit parameter exceeds the predetermined fit value at a point 343". A second horizontal line segment 372 is fitted to the data which spans a time interval $t_2$ shown at 378. The entire process is yet again repeated starting with a specific value of $\rho(p)$ identified as 343", and ending with the final value $\rho(n)$ yielding a third horizontal line segment 374 is fitted to these data which span the time interval $t_3$. In the hypothetical example shown in FIG. 18, three horizontal line segments 370, 372 and 374 are fitted to all of the data $\rho(p)$ falling within sample period $t_S$, and each line segment represents a sector of constant density.

It should be understood that other methods can be used to group interval compensated density values of essentially the same value, and to relate the number of such compensated density values within the group to the time interval $t_i$ corresponding to the group.

Corrected density $\rho_{c,i}$ over each azimuthal segment i is determined using the relationship $$\underline{\rho}(p) = \left( \sum_{p=1}^{n'} \rho(p) \right) / n' \quad (6)$$

where n' is the total number of values of $\rho(n)$ over the time interval $t_i$.

The method above yields a group of time segments $t_i$ over which corrected density is essentially constant. As illustrated in the discussion of segmented standoff measurements, the method of segmented density measurements yields azimuthal density measurements which are much more statistically precise than those that could be obtained form spine and rib calculations of data measured during a single time interval $\Delta t$.

Figure 19:
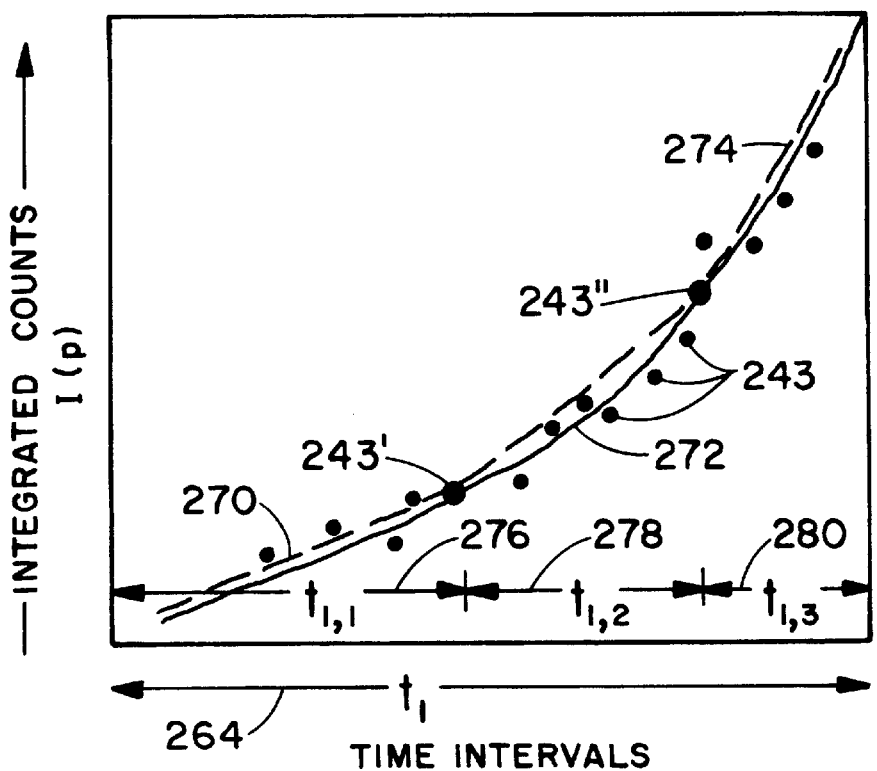
FIG. 19 illustrates the line segment fitting method to determine standoff for a region of constant density.

Once segmented density measurements are determined, corresponding constant standoff segments for each time segment $t_i$ are then determined using methodology discussed previously in section 3 and illustrated graphically in FIG. 6. Attention is directed to FIG. 19 which is a plot of integral detector counts I(p) (see section 3) as a function of time intervals within a time segment $t_i$. In FIG. 19, the time segment is defined by azimuthal regions of essentially constant density. A time segment $t_i$ with i=1, as shown in FIG. 18 at 264, is used as an example. The method applies, however, for all valves of $t_i$. The points 243 represent the sorted and integrated count samples I(p) encompassing p=1 to n, over the entire time segment $t_1$. Only a few I(p) points 243 are shown for clarity of the illustration. A nonlinear curve 268 is drawn through the data points 243 to illustrate a LWD density tool operating with varying standoff, even though the corrected density remains essentially constant.

Still referring to FIG. 19, a straight line 270, shown as a broken line, is fitted to the first h values of I(p) where p=1, . . . ,h, and a goodness of fit parameter is obtained such as chi-square. If the fit parameter is less than a predetermined fit value, another point I(h+1) is added and a new fit parameter is obtained. This process is repeated until the fit parameter exceeds the predetermined fit value, and the first straight line segment 270 is thereby determined. The segment spans a time interval $t_{1,1}$ shown at 276. The entire process is again repeated starting with the specific value of I(p) identified as 243', and a second straight line segment 272 is thereby determined which spans a time interval $t_{1,2}$ shown at 278. The entire process is yet again repeated starting with a specific value of I(p) identified as 243", and ending with the final value I(n) in the yielding a third straight line segment 274, which spans the time interval $t_{1,3}$ shown at 280. In the hypothetical example shown in FIG. 6, three straight line segments 270, 272 and 274 are fitted to all of the data I(p) falling within sample period $t_1$, which encompasses a region of essentially constant corrected density.

The data processing methods discussed above and illustrated in FIGS. 18 and 19 not only improve the accuracy of previously discussed tool standoff measurements, but also detects with precision and accuracy azimuthal changes in formation density as the tool is conveyed along the well borehole. This information is useful in determining formation bed boundaries, especially in situations where the borehole is penetrating layers formations at a steep angle.

The method of processing data by constant density segmentation as well as constant standoff segmentation also serves as an alternative method for presenting azimuthal formation density data. Instead of having predetermined quadrants (see FIG. 13) over which average formation density is calculated, the method graphically shown in FIGS. 18 and 19 can determine boundaries over which formation density is changing.

Figure 20:
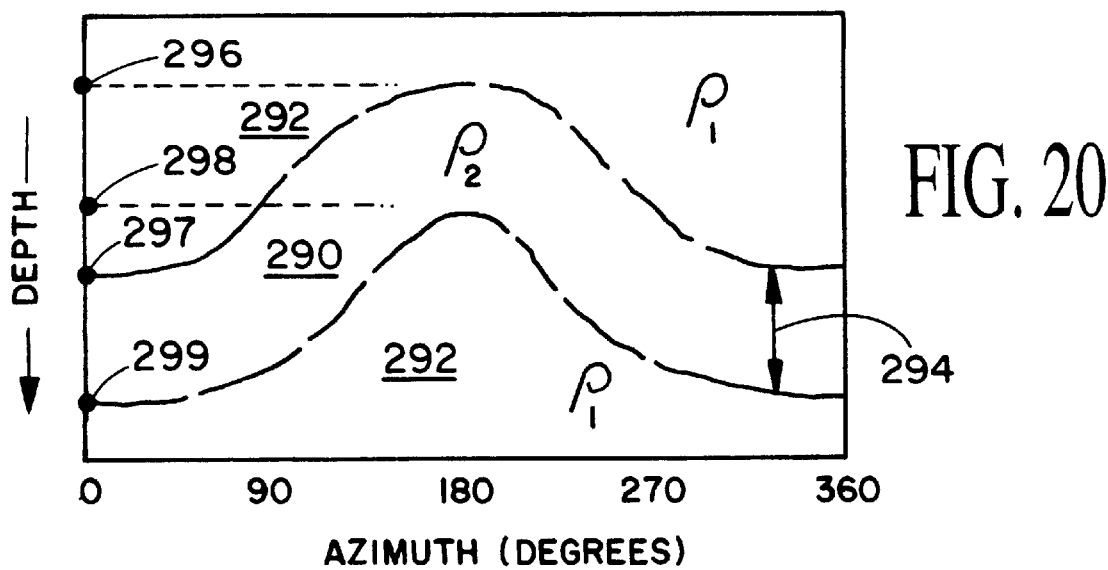
FIG. 20 illustrates a continuous image of borehole density generated with a tool containing optional directional and orientation sensors.
Figure 21:
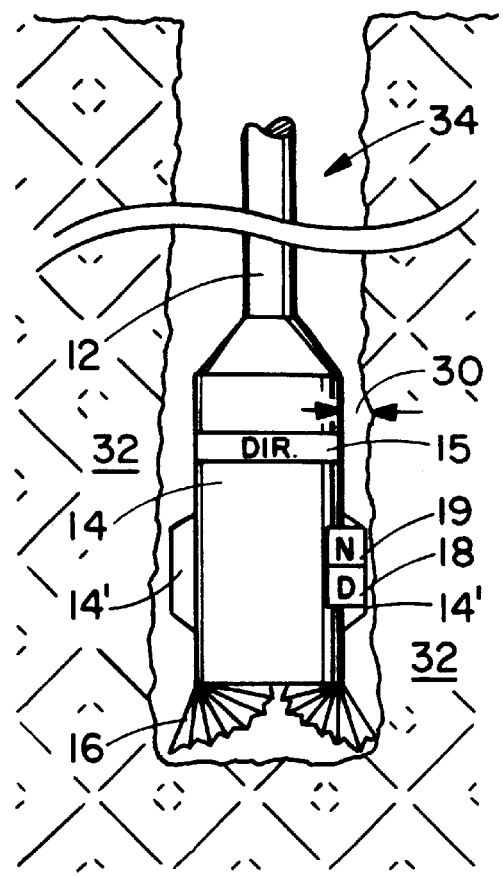
FIG. 21 illustrates a LWD tool with density and neutron measuring devices, and with optional tool directional and orientation sensors.

With suitable tool orientation and directional sensors 15 as shown in FIG. 21, the methodology yielding azimuthal density can be combined with tool depth measurements to yield a continuous image of formation density. A hypothetical example of such an image is shown in FIG. 20. The abscissa of the illustration represents the azimuth of the tool with respect to a reference point, such as true north, and the ordinate represents the depth of the tool within the borehole. A thin bed of density $\rho_2$ and thickness 296 is shown bounded by beds of density $\rho'$. The thin bed is slanting or "dipping" with respect to the angle of the borehole with the high or "updip" side of the bed at 180 degrees and the "downdip" side at 0 degrees. The top of the updip side of the bed occurs at a depth 296 and extends to a depth 298. The downdip side of the bed occurs at a depth 297 and extends to a depth of 299.

Even without directional sensors 15, the method of density segmentation can be used to determine the number of different azimuthal densities, magnitudes of all of these densities, and the fraction of the borehole over which each density occurs.

9. Correcting Neutron Data Using Standoff Segmentation from the Density Tool

FIG. 21 illustrates a LWD tool 14 containing a preferably dual detector density tool 18 and a neutron tool 19 in close proximity to the density tool. The neutron tool contains a source (not shown) such as an isotopic or accelerator type source of neutrons, and one or more detectors (not shown) which respond to fast, epithermal, or thermal neutrons. As discussed previously, the neutron tool responds primarily to the hydrogen content of the borehole environs. If it is assumed that most hydrogen is contained in pore space of the formation and not in the rock matrix, then the tool response to hydrogen concentration can be related to formation porosity. Unfortunately, hydrogen is usually also present in fluid within the borehole, therefore the neutron tool response is also affected by borehole size, drilling fluid or "mud" weight, drilling mud salinity, and tool standoff. Formation porosity measurements, and any other measurements obtained from the neutron tool, must be corrected for these effects in order to obtain accurate parametric measurements. Previously discussed standoff data obtained from the density tool can be used to correct the neutron tool response for borehole size and standoff effects.

The diameter of the density tool is defined as D. This will be the diameter of the stabilizer blade 14' (see FIG. 21) if the tool is a LWD tool. If the density tool is embodied for wireline applications, D will represent the diameter of the density "pad" (not shown). The diameter of the neutron tool is defined as C. This will also be the diameter of the collar 14 if the tool is embodied as a LWD tool as shown in FIG. 21. For wireline embodiments, the diameter of the neutron subsection is C. Values of C and D are, of course, known. Using terminology defined in the above discussion of segmented standoff measurements with the density tool, assume that n segments of standoff $S_i$ are measured by the density tool. The average diameter $d_{ave}$ of the borehole 34 is $$d_{ave} = D + \Sigma(S_i)/n \tag{7}$$

and the standoff $S_{neu,i}$ for the neutron tool in segment $S_i$ is $$S_{neu,i} = S_i + D - C \tag{8}$$

The values of $d_{ave}$ and $S_{neu,i}$ are then used to correct the response of the neutron tool in each segment i for borehole size and standoff, respectively, using calibration methods, charts and algorithms known in the art. Neutron borehole and standoff corrections are applied for each standoff segment using the average borehole size and neutron tool standoff for each standoff segment $S_{neu,i}$ to provide average corrected neutron parametric measurements such as neutron porosity.

Figure 22:
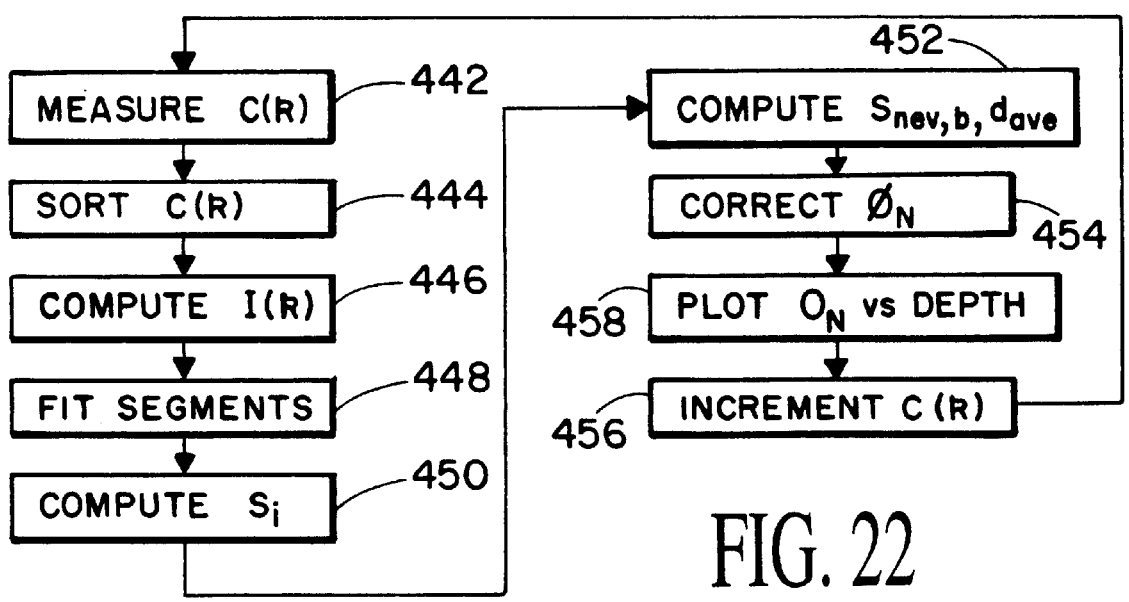
FIG. 22 is a flow chart illustrating the use of standoff measurements made with the density tool to correct data measured with the neutron tool.

FIG. 22 illustrates a flow chart incorporating segmented standoff measurements to correct a neutron porosity measurement for neutron tool standoff and for borehole size. Density tool detector count rates C(k) are measured at step 442 and sorted at step 444 as discussed previously. Physically insignificant data are discarded as previously discussed and illustrated conceptually in FIG. 15. The previously defined count integrals I(k) are computed at step 446, segments are fitted at step 448, and density standoff segments $S_i$ are computed at step 450. Borehole diameter $d_{ave}$ and neutron tool standoff $S_{neu,i}$ are computed using equations (7) and (8), respectively, at step 452. Corrected neutron porosity $\Phi_n$ is computed at step 454 using values of $d_{ave}$, neutron tool standoff $S_{neu,i}$ and previously known calibration constants. Corrected neutron porosity $\Phi_n$ is plotted as a function of depth at step 458. Density tool count rates are then incremented at step 456, and the process is repeated thereby forming the desired corrected neutron porosity log as the tool 14 moves along the well borehole.

10. Alternate Methods for Computing Corrected Formation Density

There are other variations of the standoff segmentation and constant density segmentation that can be used in appropriate situations to optimize accuracy and precision of borehole and formation parameters of interest. These methods are summarized as follows:

(a) Given a range of rotational speed of the drilling instrument 14 (see FIGS. 1 and 21), apparent and corrected densities as previously defined are calculated for each small sample $\Delta t$ and an average corrected density is calculated for the entire sample collected over time $t_s$ by averaging the corrected densities.

(b) Method (a) with a provision to eliminate some of the small samples based upon the corresponding standoff value calculated from the spine and rib correction using apparent and corrected densities. As an example, it may be desirable not to include density values in the average that are measured at a relatively large standoff.

(c) Average the apparent densities measured by each detector of the density tool, and then apply a correction for the entire sample $t_s$ using the average apparent densities. This is equivalent to calculating a geometric mean rather than an arithmetic mean of the detector count rates.

(d) Method (c) with a provision to eliminate some of the small samples based upon the corresponding standoff value calculated from the spine and rib correction using apparent and corrected densities. Again as an example, it may be desirable not to include density values in the average that are measured at a relatively large standoff.

What is claimed is:

1. A method for determining a property of earth formation penetrated by a borehole, comprising the steps of:

(a) positioning at least two radiation detectors within said borehole;

(b) measuring a plurality of detector responses from each of said at least two detectors over a time interval;

(c) sorting by magnitude said detector responses collected over a sample period from a first detector into sorted first detector responses;

(d) determining standoff of said first detector from a borehole wall during a time segment from said at sorted first detector responses; and (e) combining said determined standoff with a second detector response measured during said time segment to determine said property of earth formation, wherein said determined property of earth formation is corrected for adverse effects of said standoff.

2. The method of claim 1, further comprising the steps of:
(a) computing running integral sums from said sorted first detector responses;
(b) fitting at least one linear segment to said running integral sums over said time segment; and
(c) determining said standoff during said time segment from a slope of said at least one linear segment.

3. The method of claim 2 wherein:
(a) said first detector responds to gamma radiation;
(b) said second detector responds to neutron radiation; and
(c) said property of earth formation is formation porosity.

4. The method of claim 3, further comprising the steps of:
(a) obtaining at least two said linear segments, wherein each linear segment corresponds to said first detector response in an azimuthal segment of said borehole;
(b) determining standoff for each said azimuthal segment from each of said corresponding linear segment; and
(c) combining said standoff measurements from each said azimuthal segment with a response of said second detector in each said azimuthal segment to obtain a measure of formation porosity in each said azimuthal segment.

5. The method of claim 4 comprising the additional steps of:
(a) combining said standoff measurements from each of said azimuthal segments to obtain an average diameter of said borehole; and
(b) correcting said measure of formation porosity in each said azimuthal segment for adverse effects of said borehole diameter.

6. The method of claim 1 comprising the additional steps of:
(a) defining a detector response threshold;
(b) comparing each said plurality of detector responses from said first detector with said detector response threshold; and
(c) including detector responses from said first detector in said sorted first detector responses based upon said comparison.

7. The method of claim 1 wherein said at least two detectors are conveyed within said borehole by means of a drill string.

8. A method for determining porosity of earth formation penetrated by a borehole, comprising the steps of:
(a) providing a tool which is conveyable along said borehole;
(b) positioning within said tool a neutron source, at least one neutron detector, a gamma ray source, and at least one gamma ray detector;
(c) measuring over a time interval a plurality of responses of said at least one neutron detector induced by said neutron source;
(d) measuring over said time interval a plurality of responses of said at least one gamma ray detector induced by said gamma ray source;
(e) sorting by magnitude said responses from said at least one gamma ray detector;
(f) computing running integral sums from said sorted responses from said at least one gamma ray detector;
(g) fitting at least one linear segment to said running integral sums thereby defining a time segment;
(h) determining standoff of said tool during said time segment from a slope of said at least one linear segment; and
(i) combining said standoff with corresponding responses of said at least one neutron detector measured during said time segment to determine formation porosity.

9. The method of claim 8 including the additional step of relating said time segment to an azimuthal sector of borehole thereby determining formation porosity for said azimuthal sector.

10. The method of claim 9 including the additional steps of:
(a) fitting a plurality of linear segments to said running integral sums thereby defining a plurality of time segments;
(b) determining standoff of said tool during each said time segment from a slope of each said linear segments; and
(c) combining said standoffs with corresponding responses of said at least one neutron detector measured during each of said time segment to determine formation porosity as a function of a plurality of said azimuthal sectors.

11. The method of claim 8 comprising the additional step of conveying said tool within said borehole by means of a drill string.

12. A method for determining density of earth formation penetrated by a borehole, comprising the steps of:
(a) providing a tool which is conveyable along said borehole;
(b) positioning within said tool a source of radiation and a first gamma ray detector and a second gamma ray detector with each said detector at a different axial spacing from said source;
(c) measuring a plurality of detector responses from said first detector and said second detector over a time interval;
(d) for each time interval,
(i) determining a first apparent formation density from said response of said first detector,
(ii) determining a second apparent formation density from said response of said second detector, and
(iii) combining said first and said second apparent formation densities to obtain an interval compensated formation density for each time interval;
(e) sorting said interval compensated formation densities by magnitude; and
(f) grouping said interval compensated formation densities of essentially equal magnitude to obtain a segment density measurement for an azimuthal sector of said borehole.

13. The method of claim 12 wherein said step of grouping interval compensated formation densities of essentially equal magnitude comprises the steps of:
(a) plotting said sorted interval compensated formation densities as a function of increasing magnitude over a sample period;
(b) fitting horizon line segments over contiguous values of said sorted interval compensated formation densities; and
(c) determining said segment density measurements from said horizontal line segments.

14. The method of claim 13 wherein said first and said second apparent formation densities are combined using a spine and rib method.

15. The method of claim 12 comprising the additional steps of:
(a) defining a threshold value relating said first detector response and said second detector response;

(b) comparing each of said measured plurality of responses from said first detector and said second detector with said threshold value; and (c) based upon said comparison, excluding responses from said first detector and said second detector in said obtaining of said interval compensated formation density.

16. The method of claim 15 wherein said threshold is defined by the rate of change of said response of said first detector with respect the rate of change of said response of said second detector.

17. The method of claim 12 wherein said source of radiation comprises an isotopic gamma ray source.

18. The method of claim 12 comprising the additional step of conveying said tool within said borehole by means of a drill string.

19. The method of claim 18 wherein said time interval is selected based upon rotational speed of said drill string.

20. The method of claim 12 comprising the additional steps of:

(a) determining tool standoff for each said time interval from responses of at least one of said first and second gamma ray detectors within that time interval; and (b) rejecting said interval compensated formation density obtained for a time interval in which said tool standoff exceeds a predetermined magnitude.

21. The method of claim 12 comprising the additional steps of:

(a) averaging a plurality of said first apparent formation densities collected over a sample period;

(b) averaging a plurality of said second apparent formation density densities collected over said sample period; and (c) combining said averages of said first and second apparent formation densities to obtain a geometric mean of compensated formation density measured over said sample period.

22. A method for determining density and porosity of earth formation penetrated by a borehole, comprising the steps of:

(a) providing a tool which is conveyable along said borehole;

(b) positioning within said tool a source of radiation and a first gamma ray detector and a second gamma ray detector with each said detector at a different axial spacing from said source;

(c) positioning a neutron detector axially spaced from said source;

(d) measuring a plurality of detector responses from said first gamma ray detector and said second gamma ray detector over a time interval;

(e) for each time interval,
 (i) determining a first apparent formation density from said response of said first detector,
 (ii) determining a second apparent formation density from said response of said second detector, and
 (iii) combining said first and said second apparent formation density to obtain an interval compensated formation density for each time interval;

(f) sorting said interval compensated formation densities by magnitude;

(g) grouping interval compensated formation densities of essentially equal magnitude to obtain a segment density measurement for an azimuthal sector of said borehole; and (h) determining borehole compensated formation porosity for said azimuthal sector of said borehole by combining said responses of at least one of said first and second gamma ray detectors measured in a specific time interval within said azimuthal sector with a response of said neutron detector in that time interval.

23. The method of claim 22 wherein said step of determining formation porosity comprises the additional steps of:

(a) sorting by magnitude responses from at least one of said first and second gamma ray detectors collected over a sample period to form sorted detector responses;

(b) computing running integral sums from said sorted detector responses;

(c) fitting at least one linear segment to said running integral sums over said time segment;

(d) determining said standoff during said time segment from a slope of said at least one linear segment;

(f) computing average borehole diameter from said standoff; and (g) combining said neutron detector response with said standoff and said average borehole size to obtain said borehole compensated formation porosity.

24. The method of claim 22 wherein said first and said second apparent formation densities are combined using a spine and rib method.

25. The method of claim 22 wherein said step of grouping of interval compensated formation densities of essentially equal magnitude comprises the steps of:

(a) plotting said sorted interval compensated formation densities as a function of increasing magnitude over a sample period;

(b) fitting horizon line segments over contiguous values of said sorted interval compensated formation densities; and (c) determining said segment density measurements from said horizontal line segments.

26. The method of claim 22 comprising the additional steps of:

(a) defining a threshold value relating said first gamma ray detector response and said second gamma ray detector response;

(b) comparing said measures of plurality of responses from said first gamma ray detector and said second gamma ray detector with said threshold value; and (c) based upon said comparison, excluding responses from said first gamma ray detector and said second gamma ray detector in said obtaining of said interval compensated formation density.

27. The method of claim 26 wherein said threshold is defined by the rate of change of said response of said first gamma ray detector with respect the rate of change of said response of said second gamma ray detector.

28. The method of claim 22 wherein said source of radiation emits neutrons and gamma radiation.

29. The method of claim 22 comprising the additional step of providing two sources of radiation, wherein a first source emits gamma rays and a second source emits neutrons.

30. An apparatus for determining a property of earth formation penetrated by a borehole, comprising:

(a) at least two radiation detectors within said borehole;

(b) at least one source of radiation;

(c) means for measuring a plurality of detector responses from each of said at least two detectors over a time interval; and (d) computing means for
- (i) sorting by magnitude said detector responses collected over a sample period from a first detector into sorted first detector responses,
- (ii) determining standoff of said first detector from a borehole wall during a time segment from said sorted first detector responses, and
- (iii) combining said standoff with a second detector response measured during said time segment to determine said property of earth formation, wherein said determined property of earth formation is corrected for adverse effects of said standoff.

31. The apparatus of claim 30, farther comprising computing means for:
    (a) computing running integral sums from said sorted first detector responses;
    (b) fitting at least one linear segment to said running integral sums over said time segment; and
    (c) determining said standoff during said time segment from a slope of said at least one linear segment.

32. The apparatus of claim 30 wherein one of said at least two detectors responds to gamma radiation and one of said at least two detectors responds to neutron radiation.

33. The apparatus of claim 32 further comprising computing means for:
    (a) obtaining at least two linear segments, wherein each linear segment corresponds to said first detector response in an azimuthal segment of said borehole;
    (b) determining standoff for each said azimuthal segment from each of said corresponding linear segment; and
    (c) combining said standoff measurements from each said azimuthal segment with a response of said second detector in each said azimuthal segment to obtain a measure of formation porosity in each said azimuthal segment.

34. The apparatus of claim 33 further comprising computing means for:
    (a) combining said standoff measurements from each of said azimuthal segments to obtain an average diameter of said borehole; and
    (b) correcting said formation porosity measurement in each said azimuthal segment for adverse effects of said borehole diameter.

35. The apparatus of claim 30 wherein said at least one source of radiation comprises a radiation source which emits gamma radiation and neutron radiation.

36. The apparatus of claim 30 wherein said at least one source of radiation comprises:
    (a) a source which emits gamma rays; and
    (b) a source which emits neutrons.

37. The apparatus of claim 30 wherein said apparatus is conveyed within said borehole by means of a drill string.

* * * * *